US012811926B2

(12) United States Patent
Sheffield et al.

(10) Patent No.: US 12,811,926 B2
(45) Date of Patent: Nov. 24, 2026

(54) SYSTEMS AND TECHNIQUES FOR BENEFIT DENIAL SYSTEM

(71) Applicant: Lowe's Companies, Inc., Mooresville, NC (US)

(72) Inventors: Mason E. Sheffield, Woodinville, WA (US); Paul Michael Sisneros, Bothell, WA (US); Mehdi Sarkeshi, Woodinville, WA (US); Matthew Kenneth Greff, Kenmore, WA (US); Adin Michael Geist, Charlotte, NC (US)

(73) Assignee: Lowe's Companies, Inc., Mooresville, NC (US)

( * ) Notice: Subject to any disclaimer, the term of this patent is extended or adjusted under 35 U.S.C. 154(b) by 119 days.

(21) Appl. No.: 18/762,347

(22) Filed: Jul. 2, 2024

(65) Prior Publication Data

US 2024/0356908 A1 Oct. 24, 2024

Related U.S. Application Data

(63) Continuation-in-part of application No. 18/488,664, filed on Oct. 17, 2023, now Pat. No. 12,101,310,
(Continued)

(51) Int. Cl.

| | |
|---|---|
| ***H04L 9/40*** | (2022.01) |
| ***H04L 9/06*** | (2006.01) |
| ***H04L 9/32*** | (2006.01) |

(52) U.S. Cl.
CPC ........ *H04L 63/0823* (2013.01); *H04L 9/0637* (2013.01); *H04L 9/3247* (2013.01);
(Continued)

(58) Field of Classification Search
CPC . H04L 63/0823; H04L 9/0637; H04L 9/3247; H04L 63/0853; H04L 63/0876; G06F 2221/2141
See application file for complete search history.

(56) References Cited

U.S. PATENT DOCUMENTS

| | | | |
|---|---|---|---|
| 4,907,117 | A | 3/1990 | Pease et al. |
| 5,594,228 | A | 1/1997 | Swartz et al. |

(Continued)

FOREIGN PATENT DOCUMENTS

| | | | |
|---|---|---|---|
| CN | 1809833 | A | 7/2006 |
| CN | 101114327 | A | 1/2008 |

(Continued)

OTHER PUBLICATIONS

CN202310018713.X, "Office Action", Apr. 30, 2025, 13 pages.
(Continued)

*Primary Examiner* — Huan V Doan
(74) *Attorney, Agent, or Firm* — Kilpatrick Townsend & Stockton LLP

(57) ABSTRACT

Techniques described herein include receiving a first signal indicating that a location of a first electronic device has changed. The first electronic device can have a functionality and be in an unlocked state that permits use of at least one aspect of the functionality. The techniques further include storing, based on the first signal, an indication that the first electronic device is to be put into a locked state that prevents use of the at least one aspect of the functionality. The techniques further include causing, based on a second signal indicating the first electronic device is in a proximity to a boundary, at least one of: sending a command to put the first electronic device into the locked state, or foregoing the sending of the command based on a transaction that relates to the first electronic device.

20 Claims, 11 Drawing Sheets

Related U.S. Application Data which is a continuation of application No. 17/846,447, filed on Jun. 22, 2022, now Pat. No. 11,831,636, which is a continuation of application No. 16/894,591, filed on Jun. 5, 2020, now Pat. No. 11,381,553, which is a continuation of application No. 16/779,431, filed on Jan. 31, 2020, now Pat. No. 10,721,224.

(52) U.S. Cl.
CPC ...... *H04L 63/0853* (2013.01); *H04L 63/0876* (2013.01); *G06F 2221/2141* (2013.01)

(56) References Cited

U.S. PATENT DOCUMENTS

| | | | |
|---|---|---|---|
| 5,748,084 | A | 5/1998 | Isikoff |
| 5,874,902 | A | 2/1999 | Heinrich et al. |
| 6,130,602 | A | 10/2000 | O'Toole et al. |
| 6,255,958 | B1 | 7/2001 | Haimovich et al. |
| 6,317,028 | B1 | 11/2001 | Valiulis |
| 6,598,790 | B1 | 7/2003 | Horst |
| 6,607,125 | B1 | 8/2003 | Clouser et al. |
| 7,275,686 | B2 | 10/2007 | Estakhri et al. |
| 7,391,326 | B2 | 6/2008 | Puzio et al. |
| 7,530,489 | B2 | 5/2009 | Stockton |
| 7,564,360 | B2 | 7/2009 | Cote et al. |
| 7,619,528 | B2 | 11/2009 | Kobres |
| 8,941,498 | B2 | 1/2015 | Berg |
| 9,117,355 | B2 | 8/2015 | Mohiuddin et al. |
| 9,189,663 | B2 | 11/2015 | Goren et al. |
| 9,193,330 | B2 | 11/2015 | Abshire |
| 9,228,378 | B1 | 1/2016 | Sarabi et al. |
| 9,298,954 | B1 | 3/2016 | Ewing |
| 9,460,597 | B1 | 10/2016 | Clark et al. |
| 9,700,997 | B2 | 7/2017 | Schlegel et al. |
| 9,779,603 | B1 | 10/2017 | Subramanian et al. |
| 9,852,596 | B2 | 12/2017 | Alexis |
| 9,888,337 | B1 | 2/2018 | Zalewski et al. |
| 10,097,353 | B1 | 10/2018 | Carlson |
| 10,186,128 | B2 | 1/2019 | Gao et al. |
| 10,332,117 | B2 | 6/2019 | Krause et al. |
| 10,354,507 | B1 | 7/2019 | Lercari |
| 10,438,470 | B2 | 10/2019 | Wulff |
| 10,701,561 | B1 | 6/2020 | Sheffield et al. |
| 10,721,224 | B1 | 7/2020 | Sheffield et al. |
| 11,161,231 | B2 | 11/2021 | Obermann et al. |
| 11,381,553 | B2 | 7/2022 | Sheffield et al. |
| 11,395,142 | B2 | 7/2022 | Sheffield et al. |
| 11,763,610 | B2 | 9/2023 | Davis et al. |
| 11,831,636 | B2 | 11/2023 | Sheffield et al. |
| 12,101,310 | B2 | 9/2024 | Sheffield et al. |
| 12,245,031 | B2 | 3/2025 | Sheffield et al. |
| 2002/0050928 | A1 | 5/2002 | Olsen et al. |
| 2002/0059148 | A1 | 5/2002 | Rosenhaft et al. |
| 2003/0042316 | A1 | 3/2003 | Teraura |
| 2004/0145477 | A1 | 7/2004 | Easter et al. |
| 2004/0230488 | A1 | 11/2004 | Beenau et al. |
| 2004/0238621 | A1 | 12/2004 | Beenau et al. |
| 2004/0263319 | A1 | 12/2004 | Huomo |
| 2005/0128083 | A1 | 6/2005 | Puzio et al. |
| 2005/0200485 | A1 | 9/2005 | Connolly et al. |
| 2005/0257055 | A1 | 11/2005 | Anderson |
| 2005/0289359 | A1 | 12/2005 | Mori et al. |
| 2006/0071753 | A1 | 4/2006 | Lamar |
| 2007/0011729 | A1 | 1/2007 | White |
| 2007/0199988 | A1 | 8/2007 | Labgold et al. |
| 2007/0200664 | A1 | 8/2007 | Proska et al. |
| 2007/0296589 | A1 | 12/2007 | Cullum |
| 2008/0238609 | A1 | 10/2008 | Wiesner et al. |
| 2009/0043681 | A1 | 2/2009 | Shoji et al. |
| 2009/0201125 | A1 | 8/2009 | Ikeguchi et al. |
| 2010/0176919 | A1 | 7/2010 | Vertner et al. |
| 2010/0289627 | A1 | 11/2010 | McAllister et al. |
| 2011/0137797 | A1 | 6/2011 | Stals et al. |
| 2011/0254687 | A1 | 10/2011 | Arponen et al. |
| 2012/0111589 | A1 | 5/2012 | Schmidt et al. |
| 2012/0124388 | A1 | 5/2012 | Chng et al. |
| 2012/0150742 | A1 | 6/2012 | Poon et al. |
| 2012/0271712 | A1 | 10/2012 | Katzin et al. |
| 2012/0331292 | A1 | 12/2012 | Haggerty et al. |
| 2013/0066918 | A1 | 3/2013 | Nejat et al. |
| 2013/0227285 | A1 | 8/2013 | Bracher et al. |
| 2014/0019241 | A1 | 1/2014 | Treiser et al. |
| 2014/0158389 | A1 | 6/2014 | Ito et al. |
| 2014/0176305 | A1 | 6/2014 | Aljadeff |
| 2014/0207660 | A1 | 7/2014 | Brink et al. |
| 2014/0240125 | A1 | 8/2014 | Burch et al. |
| 2014/0372743 | A1 | 12/2014 | Rogers et al. |
| 2014/0373184 | A1 | 12/2014 | Mahaffey et al. |
| 2015/0022358 | A1 | 1/2015 | Huang |
| 2016/0021116 | A1 | 1/2016 | Maguire et al. |
| 2016/0042341 | A1 | 2/2016 | Griffin et al. |
| 2016/0142402 | A1 | 5/2016 | Kim |
| 2016/0253651 | A1 | 9/2016 | Park et al. |
| 2016/0325391 | A1 | 11/2016 | Stampfl et al. |
| 2016/0344740 | A1 | 11/2016 | Choi |
| 2017/0006420 | A1 | 1/2017 | Burch et al. |
| 2017/0053506 | A1 | 2/2017 | Alexis |
| 2017/0076520 | A1 | 3/2017 | Ho et al. |
| 2017/0186294 | A1 | 6/2017 | Gotanda et al. |
| 2017/0269167 | A1 | 9/2017 | Willey |
| 2017/0282859 | A1 | 10/2017 | Grimm et al. |
| 2017/0286708 | A1 | 10/2017 | Erhart et al. |
| 2017/0357523 | A1 | 12/2017 | Benson et al. |
| 2017/0359169 | A1 | 12/2017 | Benson et al. |
| 2018/0114220 | A1 | 4/2018 | Ekberg |
| 2018/0150832 | A1 | 5/2018 | Badal-Badalian et al. |
| 2018/0165480 | A1 | 6/2018 | Raju |
| 2018/0167394 | A1 | 6/2018 | High et al. |
| 2018/0336359 | A1 | 11/2018 | Lakhani et al. |
| 2018/0338241 | A1 | 11/2018 | Li |
| 2018/0375665 | A1 | 12/2018 | Contenti et al. |
| 2019/0043292 | A1 | 2/2019 | Hoossainy et al. |
| 2019/0114488 | A1 | 4/2019 | Glazer et al. |
| 2019/0130394 | A1 | 5/2019 | Stollman et al. |
| 2019/0215394 | A1 | 7/2019 | Torvinen et al. |
| 2019/0222418 | A1 | 7/2019 | O'Brien et al. |
| 2019/0244451 | A1 | 8/2019 | Favier et al. |
| 2019/0253254 | A1 | 8/2019 | Brownlee et al. |
| 2019/0288845 | A1 | 9/2019 | Wah |
| 2019/0333304 | A1 | 10/2019 | Flynn et al. |
| 2020/0059170 | A1 | 2/2020 | Brotto et al. |
| 2020/0090175 | A1 | 3/2020 | Davis et al. |
| 2020/0252430 | A1 * | 8/2020 | Peacock ................ H04W 12/63 |
| 2020/0265283 | A1 | 8/2020 | Brotto et al. |
| 2020/0342728 | A1 | 10/2020 | Brotto et al. |
| 2021/0122024 | A1 | 4/2021 | Obermann et al. |
| 2021/0152345 | A1 | 5/2021 | Beloskur et al. |
| 2021/0166247 | A1 | 6/2021 | Sirigiri et al. |
| 2021/0227383 | A1 * | 7/2021 | Alameh ................ H04W 12/63 |
| 2022/0024014 | A1 | 1/2022 | Obermann et al. |
| 2022/0156412 | A1 | 5/2022 | Davis et al. |
| 2023/0410580 | A1 | 12/2023 | Davis et al. |

FOREIGN PATENT DOCUMENTS

| | | | |
|---|---|---|---|
| CN | 105900398 | A | 8/2016 |
| CN | 106203035 | A | 12/2016 |
| CN | 107209976 | A | 9/2017 |
| CN | 107209983 | A | 9/2017 |
| CN | 109150881 | A | 1/2019 |
| CN | 109685665 | A | 4/2019 |
| CN | 109948310 | A | 6/2019 |
| CN | 110298939 | A | 10/2019 |
| CN | 115066863 | B | 7/2023 |
| EP | 1125264 | B1 | 2/2004 |
| KR | 20090001632 | A | 1/2009 |
| WO | 2015121833 | A1 | 8/2015 |
| WO | 2018228973 | A1 | 12/2018 |
| WO | 2019168943 | A1 | 9/2019 |

(56) References Cited

OTHER PUBLICATIONS

EP25160892.3 , "Extended European Search Report", Aug. 13, 2025, 8 pages.
U.S. Appl. No. 17/570,282 "Supplemental Notice of Allowability", filed Jan. 30, 2025, 2 pages.
U.S. Appl. No. 17/570,282, "Notice of Allowance", filed Nov. 18, 2024, 16 pages.
CA3,175,770, "Office Action", Nov. 18, 2024, 5 pages.
"Bosch Toolbox App", Robert Bosch GmbH, Available Online at: bosch-professional.com, Feb. 18, 2018, pp. 1-6.
"DeWalt Tool Connect", Available online at: dewalt.com, Nov. 25, 2016, pp. 1-6.
"Hilti: Internet of Things Services", Available Online at: hilti.com, Sep. 18, 2018, pp. 1-3.
"Milwaukee One-Key", Available online at: onekey.milwaukeetool.com, 2020, 7 pages.
U.S. Appl. No. 16/779,225 , "Notice of Allowance", filed Apr. 15, 2020, 15 pages.
U.S. Appl. No. 16/779,335 , "Final Office Action", filed Aug. 14, 2020, 25 pages.
U.S. Appl. No. 16/779,335 , "Non-Final Office Action", filed Apr. 1, 2020, 20 pages.
U.S. Appl. No. 16/779,431 , "Notice of Allowance", filed Apr. 27, 2020, 15 pages.
U.S. Appl. No. 16/779,431 , "Supplemental Notice of Allowability", filed Jun. 12, 2020, 3 pages.
U.S. Appl. No. 16/880,692 , "Non-Final Office Action", filed Nov. 24, 2021, 26 pages.
U.S. Appl. No. 16/880,692 , "Notice of Allowance", filed Mar. 31, 2022, 5 pages.
U.S. Appl. No. 16/880,692 , "Supplemental Notice of Allowability", filed Apr. 20, 2022, 2 pages.
U.S. Appl. No. 16/894,591 , "Non-Final Office Action", filed Oct. 5, 2021, 8 pages.
U.S. Appl. No. 16/894,591 , "Notice of Allowance", filed Mar. 2, 2022, 10 pages.
U.S. Appl. No. 17/846,447 , "Notice of Allowance", filed Aug. 2, 2023, 9 pages.
U.S. Appl. No. 17/846,447 , "Supplemental Notice of Allowability", filed Oct. 31, 2023, 2 pages.
U.S. Appl. No. 18/488,664 , "Notice of Allowance", filed Jun. 11, 2024, 9 pages.
CA3,165,047 , "Office Action", Mar. 21, 2023, 3 pages.
CA3,165,047 , "Office Action", Dec. 1, 2022, 5 pages.
CA3,175,770 , "Office Action", Jan. 5, 2024, 5 pages.
CA3165047 , "Notice of Allowance", Aug. 15, 2023, 1 page.
CA3165067 , "Notice of Allowance", Apr. 6, 2023, 1 page.
CA3165067 , "Office Action", Nov. 23, 2022, 4 pages.
CN202080095101.5 , "Office Action", Mar. 12, 2024, 2 pages.
CN202080095101.5 , "Office Action", Oct. 23, 2023, 22 pages.
CN202080095101.5 , "Office Action", Mar. 18, 2023, 26 pages.
CN202080095153.2 , "Notice of Decision to Grant", Apr. 15, 2023, 6 pages.
EP20916280.9 , "Extended European Search Report", Jan. 29, 2024, 9 pages.
EP20916796.4 , "Extended European Search Report", Jan. 3, 2024, 5 pages.
PCT/US2020/062202 , "International Preliminary Report on Patentability", Aug. 11, 2022, 17 pages.
PCT/US2020/062202 , "International Search Report and Written Opinion", Feb. 24, 2021, 18 pages.
PCT/US2020/062709 , "International Preliminary Report on Patentability", Aug. 11, 2022, 8 pages.
PCT/US2020/062709 , "International Search Report and Written Opinion", Feb. 25, 2021, 9 pages.
CN202310616346.3 , "Office Action", Jul. 10, 2025, 14 pages.
CA3175770, "Notice of Allowance", Jan. 14, 2026, 1 page.
U.S. Appl. No. 19/025,684 , "Non-Final Office Action", May 19, 2026, 10 pages.
CN202310616346.3 , "Office Action", Apr. 30, 2026, 13 pages.
EP20916796.4 , "Office Action", May 20, 2026, 8 pages.

* cited by examiner

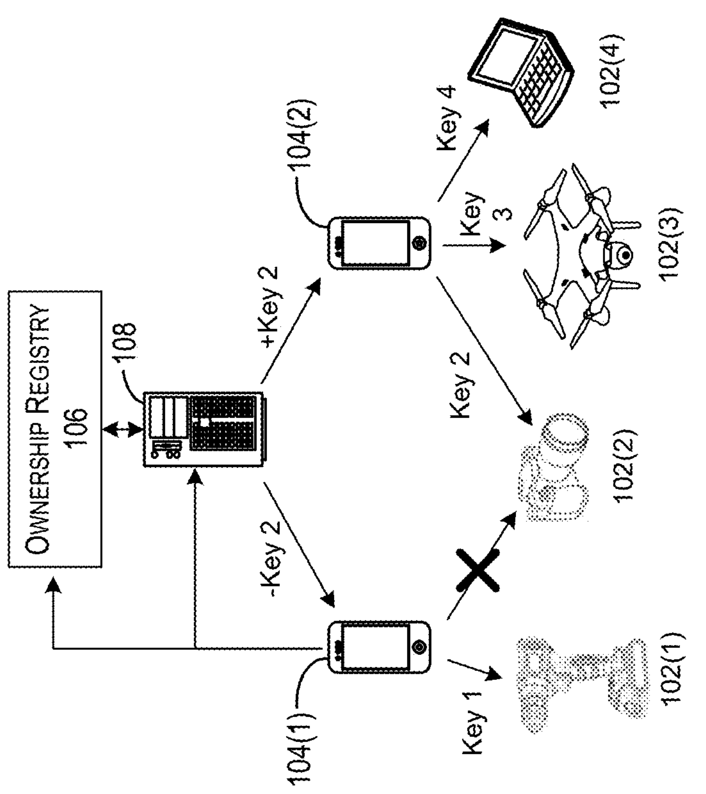
FIG. 3B
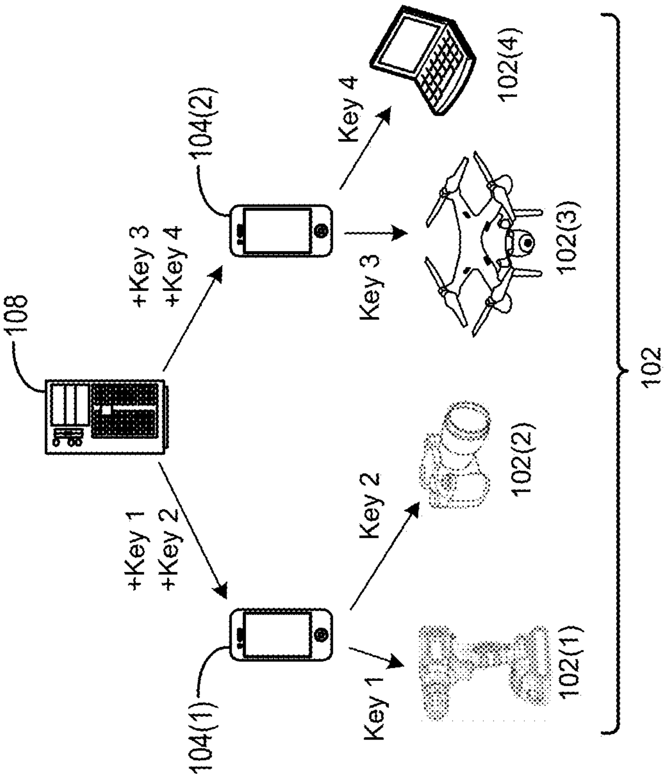
FIG. 3A
FIG. 3

SYSTEMS AND TECHNIQUES FOR BENEFIT DENIAL SYSTEM

CROSS-REFERENCES TO RELATED APPLICATIONS

This application is a continuation in part of U.S. patent application Ser. No. 18/488,664, filed Oct. 17, 2023, which is a continuation of U.S. Pat. No. 11,831,636, granted Nov. 28, 2023, which is a continuation of U.S. Pat. No. 11,391,553 on Jul. 5, 2022, which is a continuation application of U.S. Pat. No. 10,721,224, granted Jul. 21, 2020, the entire contents of which are hereby incorporated in their entirety for all purposes.

This application is related to U.S. Pat. No. 10,701,561, granted Jun. 30, 2020, as well as U.S. application Ser. No. 16/779,335 filed Jan. 31, 2020, which are each herein incorporated by reference in their entirety for all purposes.

BACKGROUND

With advancements in technology, electronic devices can be configured to perform a number of functions (e.g., secondary functions) which are additional to any primary function of the electronic device. An owner of the electronic device may be required to fulfill certain conditions (e.g., registration, etc.) in order to access such secondary functions. While a retailer that initially sells the electronic device may provide an initial purchaser with a means to fulfill those conditions, it does not typically provide such a means to secondhand purchasers. The result is a decrease of the electronic device's value to purchasers who are unable to access the secondary functions of the electronic device.

Embodiments of the invention address these and other problems, individually and collectively.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques described herein are directed to a system and methods for enabling a transfer of access rights for an electronic device between users. For the purposes of this disclosure, access rights for an electronic device refer to an ability to issue commands to the electronic device and have the electronic device execute those commands. Such a command may not be executed unless the command is accompanied by a device key that matches a device key stored in a secure memory of the electronic device. Hence, granting access rights to a user or user device for an electronic device may involve ensuring that the user or user device receives a device key for the electronic device.

In the system described herein, a first user (e.g., a transferor) may, upon determining that access rights should be granted to a second user (e.g., a transferee), generate a transaction record that includes information about the second user. In some embodiments, the transaction record may include a digital signature that can be used to verify the authenticity of the transaction record (e.g., using a cryptographic key associated with the first user). The transaction record may then be provided to a registry network, which may verify the transaction record as well as a current ownership status. Upon verification, the transaction record may be written to an ownership registry and a mobile application server may be notified of the grant of access rights. The mobile application server may then identify an account associated with the second user as well as at least one second user device associated with that account. The mobile application server may also identify a device key associated with the electronic device and may transmit that device key to the second user device to be stored in local memory. Once the device key has been received at the second user device, the second user device may be used to issue commands to the electronic device.

One embodiment of the disclosure is directed to a method comprising receiving, at a first user device operated by a first user, a request to grant access rights to a second user for an electronic device associated with the first user, receiving, by the first user device, information associated with the second user, generating a transaction record that includes at least a portion of the information associated with the second user, and providing the transaction record to a server, wherein upon verifying the transaction record, a device key associated with the electronic device is caused to be provided to a second user device associated with the second user.

Another embodiment of the disclosure is directed to a user device associated with a first user comprising: a processor; and a memory including instructions that, when executed with the processor, cause the user device to, at least: receive a request to grant access rights to a second user for an electronic device associated with the first user, receive information associated with the second user, generate a transaction record that includes at least a portion of the information associated with the second user, and provide the transaction record to a server, wherein upon verification of the transaction record, a device key associated with the electronic device is caused to be provided to a second user device associated with the second user.

Yet another embodiment of the disclosure is directed to a method comprising receiving, at a transferee user device, a request to obtain access rights for an electronic device associated with a transferor user device, providing, to the transferor user device, a request to grant access rights for the electronic device associated with a transferor user device, receiving a device key associated with the electronic device, and storing the device key in association with the electronic device in memory of the transferee user device.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which:

FIG. 3A depicts a state prior to the transfer of command execution authority for an electronic device;

FIG. 3B depicts a state during and subsequent to the transfer of command execution authority for an electronic device;

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
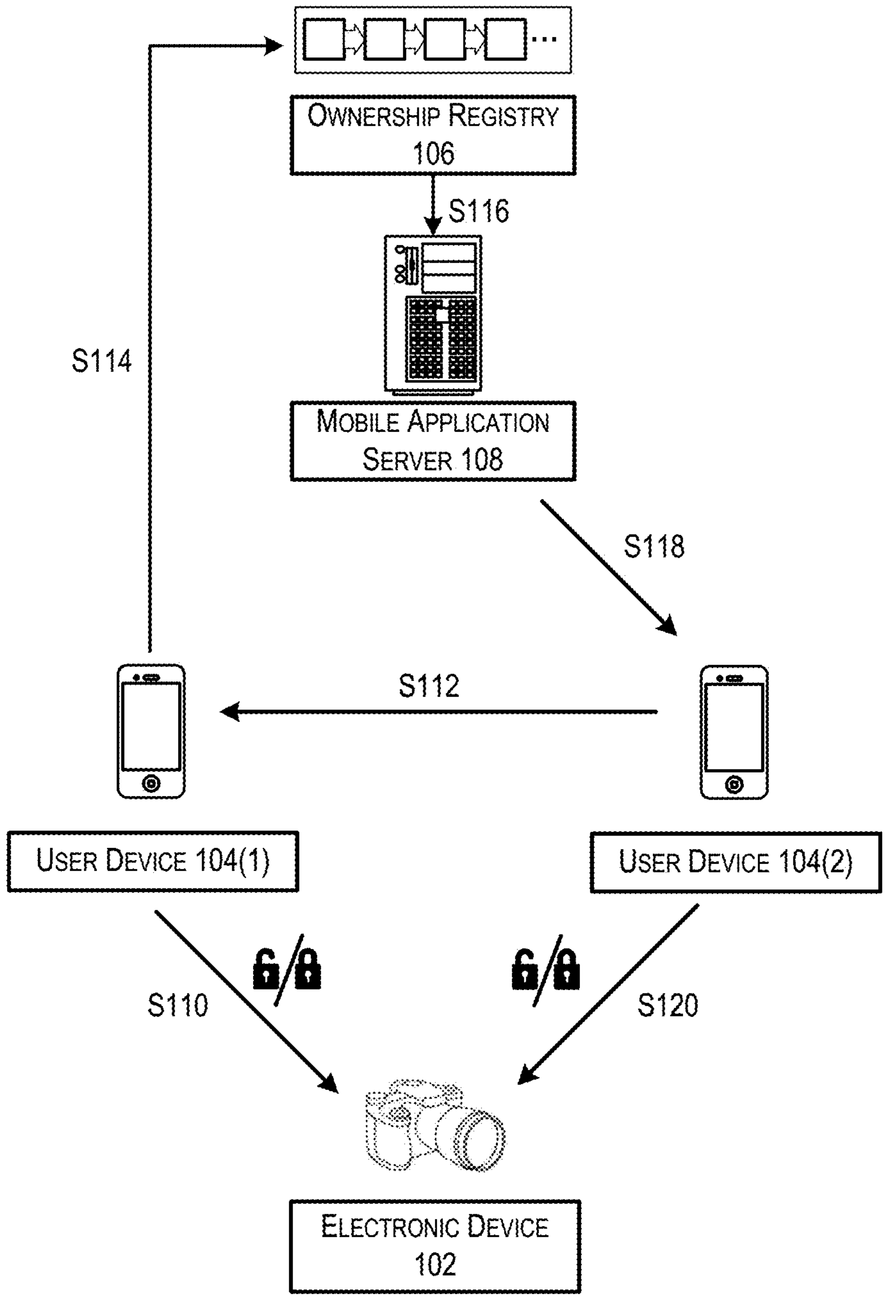
FIG. 1 depicts an illustrative overview of an example system in which a device key capable of being used to issue commands to an electronic device may be transmitted between user devices in accordance with at least some embodiments.

FIG. 1 depicts an illustrative overview of an example system in which a device key capable of being used to issue commands to an electronic device may be transmitted between user devices in accordance with at least some embodiments. In FIG. 1, an electronic device 102 is depicted as communicating with multiple user devices 104. An ownership registry 106 may maintain a record of a current ownership status for the electronic device 102. Each of the user devices 104(1 and 2) may be associated with different accounts maintained by a mobile application server 108. The mobile application server 108 may maintain a mapping of an identifier for each electronic device 102 to a corresponding device key.

The electronic device 102 may be any suitable device that accomplishes its purpose electronically. The electronic device 102 may have installed within it an electronic circuit which enables it to be locked and/or unlocked. In some embodiments, the electronic circuit may be installed between a power source and other components of the electronic device 102 configured to perform some function, such that the electronic circuit is able to restrict or disrupt power to those components. At least a portion of the electronic circuit may include a secure element which includes encrypted data that cannot readily be accessed outside of the secure element. One or more device keys may be stored within this secure element of the electronic circuit.

An electronic device 102 may be configured to perform multiple functions. In some embodiments, the electronic circuit may be configured to restrict or disrupt certain functions of the multiple functions performable by the electronic device 102, either individually or as a group. Some illustrative examples of an electronic device having an electronic circuit as described herein are described in greater detail with respect to U.S. patent application Ser. No. 16/779,335, entitled "BENEFIT DENIAL SYSTEM FOR SELECTIVELY PREVENTING OPERATION OF POWER TOOLS," which are herein incorporated by reference in their entirety for all purposes. In some embodiments, the electronic circuit may operate using a power source (hereinafter "independent power source") which is separate and/or distinct from the power source of the electronic device 102 itself, enabling an operation to be performed using the electronic circuit even if the electronic device 102 is unpowered (e.g., disconnected from its power source). If, for example, the electronic device 102 is a cordless drill with a removable and replaceable rechargeable battery adapted to power a drilling function, a power source (e.g., compact battery, such as a watch battery) separate and/distinct from the rechargeable battery can be included with the drill and used to power the electronic circuit while the rechargeable battery is removed from the drill. In some cases, the independent power source may be recharged by drawing power from the power source of the electronic device 102. In some embodiments, the electronic circuit may include an inductive coil which enables it to be powered remotely in order to perform an operation.

The user device 104 may be any electronic device capable of establishing a communication session with another device and transmitting/receiving data from that device. A user device 104 may include the ability to download and/or execute mobile applications. User devices may include mobile communication devices as well as personal computers and thin-user devices. By way of illustrative example, a user device may be a smart phone, a personal data assistant (PDA), or any other suitable handheld device.

In some embodiments, the user device 104 may include a communication interface configured to enable communication between the user device and another electronic device (e.g., mobile application server 108, an electronic device 102, another user device 104, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. A second example of a suitable communication interface may include an optical input device capable of obtaining graphical input, such as a camera device or a barcode reader. In this second example, the user device 104 may be presented with a machine-readable code, which may be scanned using the optical input device in order to obtain data encoded into the machine-readable code. In some embodiments, the communication interface may include both long-range and short-range communication means. For example, the communication interface may include an antenna configured to connect to a cellular network in order to enable communication with various other components of the depicted architecture.

An ownership registry 106 may be any suitable data store which maintains records related to ownership of an electronic device 102. In some embodiments, the ownership registry 106 may be implemented on a blockchain network, which includes a distributed database that maintains a continuously-growing list of records secured from tampering and revision called a blockchain (or blockchain ledger). A blockchain may include a number of blocks of transaction records for a number of users/electronic devices. Each block in the blockchain can also contain a timestamp and a link to a previous block of the blockchain. Stated differently, transaction records in a blockchain may be stored in an ownership registry as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network. Any node within the blockchain network may subsequently use the blockchain to verify transactions. A node of the blockchain network may be any computing device which is included within the blockchain network. In some embodiments, a mobile application server 108 may also be a node of the blockchain network.

The mobile application server 108 may be any computing device configured to provide remote support for a user device 104. The mobile application server 108 may be associated with a set of computer executable instructions to be installed on, and executed from, the user device 104(e.g., a mobile application). The mobile application server 108 may provide any suitable service and/or processing for the user device 104. For example, the mobile application server 108 may perform calculations on behalf of the user device 104. In some embodiments, the mobile application server may maintain an account for one or more users. The mobile application server 108 may also store any protocols and/or user preferences related to the operation of the user device.

The mobile application server 108 may be made up of any computer or cluster of computers. For example, the mobile application server 108 can be a large mainframe, a minicomputer cluster, or a group of servers functioning as a unit. The mobile application server 108 may be coupled to a database and may include any hardware, software, other logic, or combination of the preceding for servicing the requests from one or more client computers (e.g., access device 104 and/or user device 104). The mobile application server 108 may comprise one or more computational apparatuses and may use any of a variety of computing structures, arrangements, and compilations for servicing the requests from one or more client computers.

In some embodiments, at least a portion of the functionality performed by a mobile application installed upon, and executed from, the user device 104 may be performed by a mobile application server 108 in communication with the mobile application. For example, upon execution of a mobile application, the user device 104 may establish a communication session with the mobile application server 108 in which at least some processing is performed by the mobile application server 108 on behalf of the mobile application. In some embodiments, the mobile application server 108 may maintain an account associated with the user device and/or its user. The account maintained by the mobile application server 108 may store a number of data elements related to the user. For example, the application server may store user data, information on item (e.g., electronic device) ownership, or any other suitable data. In some embodiments, each account may be associated with a pair of cryptographic keys, such as a public and private cryptographic key pair. Additionally, the mobile application server 108 may maintain a mapping of device keys to electronic devices. The mobile application server may, upon receiving an indication of a transfer of ownership of the electronic device 102, automatically (e.g., without human interaction) identify the device key associated with the electronic device 102 and associate that device key to an account for the new owner. The mobile application server may also automatically identify a user device 104 associated with the new owner (via the stored user data) and may transmit the device key to that user device (e.g., via a push notification). In some embodiments, the device key, once received by the user device, may be used to interact with the electronic device 102(e.g., to issue lock and/or unlock commands) over a communication channel (e.g., BLUETOOTH™).

A device key may be any suitable string of characters capable of being used to authorize an operation (e.g., a lock or unlock operation) with respect to the electronic device 102. A device key may be unique to a particular electronic device. In other words, each electronic device may be associated with a different device key. In some embodiments, a device key may be a random or pseudo-random string of characters, such that the device key cannot be readily derived from information related to the electronic device. In some embodiments, a device key may be derivable from an identifier for the electronic device. In these embodiments, a device key may be independently generated by any entity that has the prerequisite information (e.g., an entity in possession of the electronic device) and access to an algorithm (which may be secret) for generating such a device key. For example, in some embodiments, a device key may be derived for a particular electronic device by applying a hash function to an identifier for that electronic device. In this example, the identifier for the electronic device may correspond to a Universal Product Code (UPC) and serial number or other identifier. Some electronic devices may include an indication of their respective identifiers (e.g., within a barcode or other machine-readable code associated with the electronic device).

In some embodiments, a first user device 104(1) may acquire a device key for an electronic device from a retailer (or other resource provider) when the electronic device is initially purchased from the retailer. Some illustrative examples of techniques in which a user device may obtain a device key as described herein are described in greater detail with respect to U.S. patent application Ser. No. 16/779,225, entitled "System and Techniques for Secret Key Transfer in Benefit Denial System," which is herein incorporated by reference in its entirety for all purposes. When a current owner of the electronic device 102 wishes to sell, or otherwise transfer ownership of the electronic device, the device key may be provided to the new owner using techniques described herein. This may involve removing the device key from user device 104(1) and providing the device key to a user device 104(2) associated with the new owner.

In some embodiments, a device key stored in an electronic device 102 may be altered or changed. For example, a new owner of an electronic device 102 may, upon completing a purchase for the electronic device and receiving the device key, replace or overwrite the existing device key with a new device key. The replacement device key may be of his or her choosing or it may be random or pseudo-random (e.g., selected by the mobile application). Note that an operation to replace or overwrite an existing device key may require that the current device key be provided. In some embodiments, an electronic device 102 may include multiple device keys, each of which may be specific to the electronic device 102. For example, a single electronic device 102 may include two separate device keys, where a first device key may be provided to a purchaser of the electronic device 102(and which may be replaced) and a second device key which may be stored by the resource provider and/or mobile application server 108 without being provided to the purchaser (i.e., a master key).

By way of illustrating interactions between various components of the system described herein, consider the following scenario. In the illustrated scenario, a first user having user device 104(1) may be capable of using a device key stored locally on user device 104(1) to interact with the electronic device 102 at S110. This user may wish to transfer an ownership interest in (e.g., sell or give) the electronic device 102 to a second user having a second user device 104(2).

In this example, the first user may obtain information about the second user to be used in the transfer at S112. For example, the second user may provide an identifier that may be used to uniquely identify an account associated with the second user. In some cases, the second user may also provide a public key (of a public-private cryptographic key pair) associated with the second user. In some cases, the information about the second user may be transmitted via a communication session opened between the first user device 104(1) and the second user device 104(2).

Upon receiving the information about the second user from the user device 104(2), the user device 104(1) may generate a transfer of ownership transaction record. The generated transaction record may be signed using a private key (of a cryptographic key pair) associated with the current owner, and may include an identifier for the electronic device 102 as well as at least a portion of the information associated with the second user. For example, the transaction record may include an identifier for the second user and/or a public key for the second user. As depicted at S114, this transaction record may be written to an ownership registry 106. However, note that in some embodiments, the transaction record may be provided directly to the mobile application server 108.

Upon receiving the transaction record, and before the transaction record can be written to the ownership registry 106, a computing node of a network which maintains the ownership registry 106 may verify the authenticity of the transaction record as well as that the owner of the user device 104(1) is the current owner of the electronic device 102. To do this, the computing node may verify an electronic signature for the transaction record. To verify the electronic signature, the computing node may perform a cryptographic operation on the signed data and compared the result to an expected data. If the signed data matches the expected data, then the transaction record may be considered verified. This may also verify that the operator of the user device 104(1) is the current owner of the electronic device 102, since that user device 104(1) must be in possession of the private cryptographic key used to create the electronic signature. In some cases, the computing node may identify the latest transaction record stored in the ownership registry related to the electronic device 102. Upon retrieving that transaction record, the computing node may use a public key indicated in that transaction record to verify the current electronic signature. Once the transaction record (and current ownership status) has been verified, the transaction record is added to the ownership registry.

Upon verifying the authenticity and ownership of the transaction record and recording the transaction record to the ownership registry 106, the mobile application server 108 may receive an indication of the transaction at S116. In some embodiments, the mobile application server 108 may be notified via a notification module which monitors transaction records recorded to the ownership registry 106. In some embodiments, upon receiving an indication of the transfer of ownership, the mobile application server 108 may identify an account associated with each of the user devices 104 as well as a device key associated with the electronic device 102. In some embodiments, this may involve performing a query on a device identifier associated with each of the user devices 104. The mobile application server 108 may then identify contact information for each of the devices stored in relation to the respective accounts. In some embodiments, one or both of the user devices 104 may not be associated with an account maintained by the mobile application server 108. In those embodiments, the mobile application server 108 may identify contact information for the user devices 104 from the transaction record recorded to the ownership registry 106.

Upon identifying the contact information for at least the user device 104(2), the mobile application server 108 may transmit the device key associated with the electronic device 102 to the user device 104(2) at S118. In some embodiments, the device key may be transmitted to the user device 104(2) via a push notification (e.g., a push update). The device key may be stored in a secure memory of the user device 104(2). In some embodiments, the device key may be encrypted. In these embodiments, the device key may be encrypted by the mobile application server 108 prior to being provided to the user device 104(2) or the device key may be encrypted by the user device 104(2) prior to being stored in memory. Upon receiving the device key, the user device 104(2) may issue commands to the electronic device 102 using the device key at S120. The electronic device 102 may include circuitry configured to allow compliance with such commands only if the device key associated with the electronic device 102 was received by the user device 104(2).

In some embodiments, the mobile application server 108 may also cause the device key to be removed from the memory of the user device 104(1), preventing it from being able to issue commands to the electronic device 102 in the future or preventing the electronic device 102 from complying with such commands. In some embodiments, this may involve the mobile application server 108 providing instructions to the user device 104(1) which cause the device key associated with the electronic device 102 to be deleted, or otherwise removed, from memory.

In some embodiments, there may be no need to remove the device key from the memory of the user device 104(1) in order to prevent the device key from being used to issue commands to the electronic device 102. For example, in some embodiments, the user device 104(2), upon receiving the device key and upon establishing a communication session with the electronic device 102, may cause the current device key to be replaced with a new device key. It is envisioned that to do this, one may need to be in possession of the current device key. Once the device key has been replaced with a new device key, that new device key may then be transmitted to the mobile application server 108, which may subsequently store the new device key for future reference. By way of a second example, in some embodiments, the mobile application server may, when providing the device key to the user device 104(2), provide an encrypted data packet. This encrypted data packet may include the device key as well as a dynamic data element which can be used to validate the data packet. For example, the mobile application server 108 may compile a data packet which includes the device key along with a counter value (e.g., a value which is incremented or decremented upon each ownership transfer) which is encrypted in a manner such that it can only be decrypted by the electronic device 102. Upon receiving the encrypted data packet with the counter value, the electronic device 102 may verify that the counter value is greater than (or less than) the previously-used counter value and may update a current counter value stored in the electronic device to match that received in the latest encrypted data packet. In this example, only data packets which include a counter value greater than or equal to the currently-stored counter value may be validated when executing a command received with the data packet.

In some embodiments, the mobile application server 108 may compile a data packet which includes the device key along with an identifier for the user device 104(2). In this example, the electronic device 102 may be associated with its own cryptographic key pair (e.g., a private and public cryptographic key). The mobile application server 108 may then encrypt the data packet using the public cryptographic key associated with the electronic device 102. This would prevent the information in the data packet from being accessed by the user device 104(2) despite the encrypted packet being stored in memory of the user device 104(2) since that information can only be accessed by the electronic device 102 having possession of the private cryptographic key. In these embodiments, the user device 104(2) upon issuing a command to the electronic device 102 at S120, would provide the encrypted data packet to the electronic device 102 along with the command to be executed. The electronic device 102 would then decrypt the encrypted packet using its private cryptographic key, verify the device key, verify that the device identifier for the user device 104(2) matches the device identifier associated with the user device 104(2) from which the command was issued, and execute the command upon verification. One skilled in the art, after reading this disclosure, would recognize that these embodiments of the system would prevent commands from being issued by user devices which have not been authorized by the mobile application server 108 even if those user devices gain possession of the encrypted data packet that includes the device key.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communication protocol.

Figure 2:
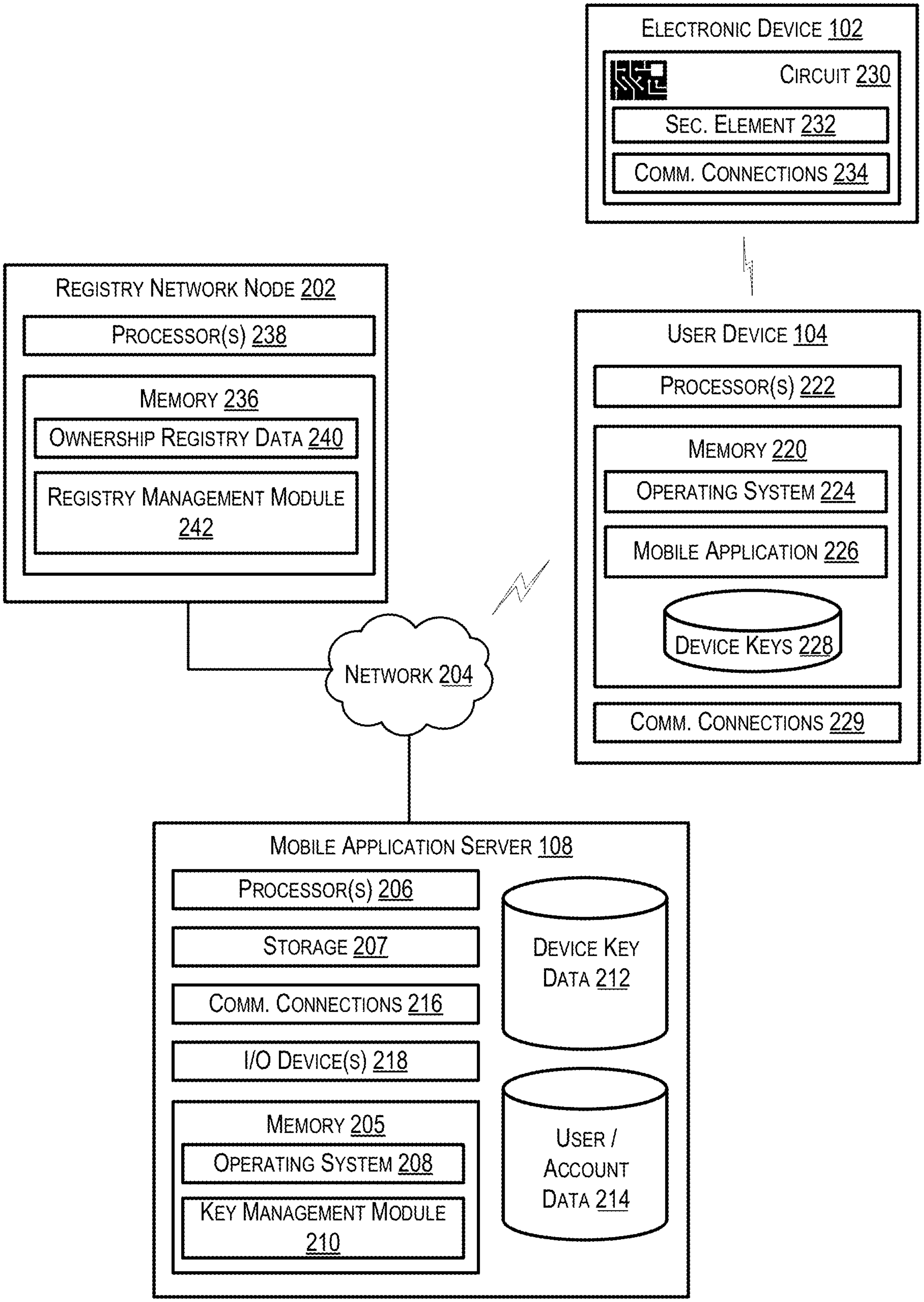
FIG. 2 depicts an example system architecture for a system that may be implemented to perform the functionality described in accordance with at least some embodiments.

FIG. 2 depicts an example system architecture for a system that may be implemented to perform the functionality described in accordance with at least some embodiments. As depicted in FIG. 2, an exemplary architecture may include an electronic device 102, one or more user devices 104, and a mobile application server 108 as described with respect to FIG. 1 above. Additionally, the system may include a number of registry network nodes 202, which form a registry network. One or more of these components may communicate either directly or over a network 204.

The mobile application server 108 may be any type of computing device configured to perform at least a portion of the functionality described herein. In some embodiments, the mobile application server 108 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 108 may include at least one memory 205 and one or more processing units (or processor(s)) 206. The processor(s) 206 may be implemented as appropriate in hardware, computer-executable instructions, firmware or combinations thereof. Computer-executable instruction or firmware implementations of the processor(s) 206 may include computer-executable or machine executable instructions written in any suitable programming language to perform the various functions described. The mobile application server 108 may also include additional storage 207.

The memory 205 may store program instructions that are loadable and executable on the processor(s) 206, as well as data generated during the execution of these programs. Depending on the configuration and type of mobile application server 108, the memory 205 may be volatile (such as random access memory (RAM)) and/or non-volatile (such as read-only memory (ROM), flash memory, etc.). The mobile application server 108 may also include additional storage 207, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 205 may include multiple different types of memory, such as static random access memory (SRAM), dynamic random access memory (DRAM) or ROM. Turning to the contents of the memory 205 in more detail, the memory 205 may include an operating system 208 and one or more application programs or services for implementing the features disclosed herein including at least a module for distributing device keys to appropriate user devices (key management module 210). The memory 205 may also include device key data 212, which provides mappings of device keys to particular electronic devices, as well as user account data 214, which provides information related to users and user accounts (e.g., demographic data as well as user devices and contact information, associated electronic devices, etc.). In some embodiments, the device key data 212 and/or user account data 214 may be stored in a database.

The memory 205 and the additional storage 207, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the mobile application server 108. The mobile application server 108 may also contain communications connection(s) 216 that allow the mobile application server 108 to communicate with a stored database, another computing device or server, user terminals, and/or other components of the described system. The mobile application server 108 may also include input/output (I/O) device(s) and/or ports 218, such as for enabling connection with a keyboard, a mouse, a pen, a voice input device, a touch input device, a display, speakers, a printer, etc.

In some embodiments, the key management module 210 may be configured to, in conjunction with the processors 206, provide device keys to user devices which are determined to be associated with an electronic device. In some embodiments, the mobile application server 108 may receive an indication that a particular electronic device 102 is now associated with a particular user account (e.g., via a registry management module 242 executed on a registry network node 202). Upon receiving this indication, the key management module 210 may create an association between the electronic device and the account. The key management module 210 may also identify, from the user/account data 214, one or more user device 104 which is associated with the indicated user account. The key management module 210 may also identify, from the device key data 212, a device key associated with the indicated electronic device 102. The key management module 210 may then transmit the identified device key to the identified one or more user devices 104. In some embodiments, this may be done via a push notification.

In some embodiments, the key management module 210 may be configured to receive a request for a transfer of ownership rights related to an electronic device 102. In these embodiments, the request may include a device identifier for the electronic device 102 as well as information about an operator of the user device 104. The key management module 210 may identify a current owner of the electronic device 102 as well as contact information for that current owner. The key management module 210 may then communicate the received request to the current owner via the identified contact information. In some embodiments, the received request may include an offer for purchase and/or payment credentials to be used in completing a transaction. Note that the transfer of ownership rights may pertain to a temporary transfer of ownership rights (e.g., a rental) for the electronic device. Once the request has been received at the user device associated with the current owner, the transfer of ownership rights may be handled as described elsewhere.

In some embodiments, the key management module 210 may additionally identify a cryptographic key and/or dynamic data associated with the electronic device 102. The key management module 210 may be configured to compile a data packet which includes the device key for the electronic device 102 as well as dynamic data. For example, the key management module 210 may identify a current counter value associated with the electronic device 102. Additionally, the key management module 210 may include an identifier for the user device 104 into the data packet. The key management module 210 may then encrypt the data packet using the identified cryptographic key, such that the data packet may only be decrypted by the electronic device 102. The key management module 210 may then provide the encrypted data packet to the user device 104.

In some embodiments, the user device 104 may comprise any portable electronic device capable of performing the functions disclosed herein as being attributed to the user device 104. The user device 104 may include a memory 220 (e.g., a computer-readable storage medium) storing instructions that, when executed by a processor 222 of the user device 104, enable the user device 104 to perform its intended functions. Turning to the contents of the memory 220 in more detail, the memory 220 may include an operating system 224 that provides executable program instructions for the general administration and operation of the user device 104, and at least a mobile application 226 configured to cause the user device 104 to communicate with the mobile application server 108 in order to receive and utilize device keys. The memory 220 may include a number of device keys 228 associated with electronic devices. Note that the device keys 228 stored in memory of the user device 104 may be encrypted. In some cases, the device keys 228 may be included within encrypted data packets which cannot be decrypted by the user device 104. Additionally, the user device 104 may include a number of communication connections 229 which enable the user device 104 to communicate with other electronic devices. The communication connections 229 may include wireless or direct physical connections. Additionally, wireless connections may include any combination of short-range or long-range wireless protocols.

In some embodiments, the mobile application 226 may be configured to, in conjunction with a processor 222, facilitate a transfer of ownership of an electronic device to or from an operator of the user device 104. To facilitate a transfer of ownership of the electronic device 102 away from an operator of the user device 104, the mobile application 226 may be configured to receive information about the electronic device 102(e.g., a device identifier) as well as information about the user to which ownership of the electronic device should be transferred. In some embodiments, at least a portion of this information may be manually input (e.g., via a GUI). In some embodiments, at least a portion of this information may be electronically input. For example, the user of the user device 104 may scan a barcode or other machine readable code that includes at least a portion of the information (e.g., a barcode for the electronic device or a barcode presented by the transferee). In some embodiments, the user device 104 may receive information about a transferee from the mobile application server 108 (e.g., upon receiving a request for a transfer of ownership from a potential transferee). Once the mobile application 226 has received the required information, it may complete an ownership transfer transaction. In some embodiments, this may involve generating a transaction record that includes the received information and causing that transaction record to be written to an ownership registry maintained on a registry network. The mobile application 226 may electronically sign the transaction record using a cryptographic key so that the transaction record can be verified. In some embodiments, each mobile application 226 may be associated with a separate pair of cryptographic keys (e.g., private and public cryptographic keys) which may be used to encrypt messages to the mobile application 226 as well as to sign transaction records by the mobile application 226. In some embodiments, the mobile application 226 may be configured to provide the transaction record to the ownership registry upon completion of a financial transaction, for example, upon receiving authorization of a payment transaction from the transferee. In some embodiments, the mobile application 226 may be configured to automatically (e.g., absent any further instruction) delete or otherwise remove a device key for an electronic device from the stored device keys 228 upon completion of a transfer of ownership of the electronic device 102 away from the operator of the user device 104.

To facilitate a transfer of ownership of the electronic device to an operator of the user device 104, the mobile application 226 may be configured to convey information about the operator of the user device 104 to a user device currently associated with the electronic device 102. In some embodiments, the user device 104 of a user to whom an electronic device 102 will be transferred may detect the electronic device 102 within its vicinity (e.g., via a wireless connection) and such a user may request to purchase or rent the detected electronic device 102. In these embodiments, the mobile application 226 may communicate a request for a transfer of ownership rights (or rental) to the mobile application server 108, which may convey that request to a current owner of the electronic device 102. In some embodiments, the mobile application 226 may provide information to be used in a transfer of ownership for the electronic device directly to a current owner of the electronic device. For example, the mobile application 226 may cause the user device 104 to establish communication with a second user device 104 which is operated by a current owner of the electronic device 102. The mobile application 226 may further cause the user device 104 of the user requesting an ownership transfer to transmit information about the operator of the user device 104 to the second user device via that connection. In a second example, the mobile application 226 may cause the user device 104 of the user requesting an ownership transfer to compile a machine-readable code which includes information about the user, which can then be scanned using an optical reader installed within the second user device. In some embodiments, to facilitate the transfer of ownership of the electronic device 102 to an operator of the user device 104, the mobile application 226 may provide a public cryptographic key associated with an account maintained by an operator of the user device 104 to the second user device, so that the public cryptographic key can be included within a transaction record.

The mobile application 226 may be further configured to cause the user device 104 to issue commands to an electronic device 102 using a device key associated with that electronic device 102. In some embodiments, the mobile application 226 may include a graphical user interface (GUI) which enables a user to interact with the mobile application 226. The mobile application 226 may present to a user of the user device, via the GUI, one or more of a list of devices detected by the user device 104, a list of electronic devices associated with the user (e.g., electronic devices for which the user device 104 has received a device key), a current status of one or more electronic devices, and/or commands available for an electronic device. The mobile application 226 may be configured to receive user input via the GUI and issue commands to an electronic device based on the received user input. For example, the user may select an option to lock or unlock a particular electronic device via the GUI. In this example, the mobile application 226 may cause the user device 104 to transmit a corresponding lock or unlock command to the electronic device 102 that includes the device key for that electronic device. In some embodiments, the mobile application 226 may receive, in response to the transmitted command, a status update for the electronic device 102.

The electronic device 102 may be any suitable electronic device having installed within it an electronic circuit 230 as described herein. As described elsewhere, the electronic circuit 230 may be installed between a power source and other components of the electronic device 102 which are configured to perform some function, such that the electronic circuit 230 is able to restrict or disrupt power to those components in order to manage the ability of the electronic device 102 to perform the function. At least a portion of the electronic circuit 230 may include a secure element 232 which includes an encrypted memory. One or more device keys may be stored within the secure element 232 of the electronic circuit. In some embodiments, processors within the circuit (and potentially within the secure element 232) may be capable of decrypting device key information in order to process commands received from a user device 104. Additionally, the electronic device 102 may include a number of communication connections 234 which enable the electronic device 102 to communicate with other devices. The communication connections 234 may include wireless or direct physical connections. Additionally, wireless connections may include any combination of short-range or long-range wireless protocols.

The registry network node 202 may be any suitable computing system or component within a registry network. A registry network node 202 may be configured to perform registry update/verification actions in accordance with embodiments described herein. In some embodiments, a registry network may be a blockchain network which includes a distributed environment implemented across number of registry network nodes 202. In some embodiments, the mobile application server 108 may also be a registry network node. The registry network node 202 may include a memory 236 (e.g., a computer-readable storage medium) storing instructions that, when executed by a processor 238 of the registry network node 202, enable the registry network node 202 to perform its intended functions. Turning to the contents of the memory 236 in more detail, the memory 236 may include a local copy of ownership registry data 240 as well as a module for managing registry data (registry management module 242).

In some embodiments, the registry management module 242 may be configured to, in conjunction with a processor 238, update ownership registry data 240 to include received transaction records. In some embodiments, the registry management module 242 may receive a transaction record from a user device 104 that includes at least an electronic device identifier. The registry management module 242 may, upon receiving that transaction record, verify that the originator of the transaction record is the current owner of the electronic device. This may involve identifying the latest transaction record currently in the ownership registry data 240 and determining whether the information included within that transaction record matches information for the originator of the transaction record. In some embodiments, the received transaction record may include an electronic signature which includes data within the transaction record which has been obfuscated using a private key associated with the originator of the transaction record. To verify such an ownership registry, the registry management module 242 may identify a public key associated with the originator of the transaction record and use it to restore the data within the transaction record. If the restored data matches the data within the transaction record, then it typically serves as evidence that the signer (e.g., the originator of the transaction record) is in possession of the private cryptographic key. In some embodiments, the registry management module 242 may identify a public cryptographic key associated with the current owner from the latest transaction record currently in the ownership registry data 240 and may use that public cryptographic key to verify the electronic signature. In these embodiments, a transaction record written to the ownership registry data 240 may include a public cryptographic key associated with the intended transferee.

Additionally, the registry management module 242 may be configured to provide a notification to a mobile application server 108 upon the successful addition of a transaction record to the ownership registry data 240. In some cases, ownership registry data 240 may generally pertain to ownership of electronic devices that span multiple mobile application servers 108. For example, an ownership registry may be manufacturer-specific (e.g., maintained for electronic devices manufactured by a particular manufacturer) and a number of mobile application servers 108 may each be associated with a different retailer that sells the electronic devices. In embodiments in which multiple mobile application servers are associated with the ownership registry data 240, the registry management module 242 may be configured to identify the mobile application server 108 associated with a particular electronic device 102. In some cases, the mobile application server 108 may be identified from a latest transaction record for an electronic device as being associated with (e.g., maintaining an account for) a current owner of the electronic device. Upon identifying an appropriate mobile application server 108 for a successfully added transaction record, the registry management module 242 may be configured to provide a notification to that mobile application server 108 related to that transaction record.

In some embodiments, the communication network 204 may include any one or a combination of many different types of networks, such as cable networks, the Internet, wireless networks, cellular networks, and other private and/or public networks. In addition, the communication network 204 may comprise multiple different networks. For example, the user device 104 may utilize a 3G network to communicate with a wireless router, which may then route the communication over a public network (e.g., the Internet) to the mobile application server 108.

FIGS. 3A and 3B depict an illustrative example in which command execution authority for an electronic device is transferred between accounts in accordance with at least some embodiments. In order to illustrate this example. FIG. 3A depicts a state prior to the transfer of command execution authority for an electronic device, and FIG. 3B depicts a state during and subsequent to the transfer of command execution authority for an electronic device. In each of these respective states, a mobile application server 108 is depicted in communication with multiple user devices 104(e.g., user devices 104(1-2)). The multiple user devices 104 are further depicted as being in communication with a number of electronic devices 102(e.g., electronic devices 102(1-4)).

As depicted at 3A, the mobile application server 108 may provide device keys to each user device 104 based on which electronic devices are associated with that user device. For example, upon determining that the operator of the user device 104(1) is the current owner of both electronic device 102(1) and electronic device 102(2), the mobile application server 108 may provide corresponding device key 1 (key 1) and device key 2(key 2) to the user device 104(1). Likewise, upon determining that the operator of the user device 104(2) is the current owner of both electronic device 102(3) and electronic device 102(4), the mobile application server 108 may provide corresponding device key 3 (key 3) and device key 4(key 4) to the user device 104(2). Each user device 104 may store the respective keys within a mapping to a device identifier for a respective electronic device.

Each of the user devices 104 may be capable of detecting, and receiving an electronic device identifier from, each of the electronic devices 102. In some embodiments, each user device may automatically detect electronic devices 102 that are within a wireless communication range of the respective user device 104. However, regardless of whether the user device 104 is able to detect or communicate with each electronic device 102, that electronic device may be configured to only execute commands that: (1) include a valid device key or (2) are confirmed by the electronic device to have been sent by a user device 104 that has a valid device key. Accordingly, each user device 104 is only able to issue commands to an electronic device 102 for which it maintains a corresponding device key. Hence, in the depicted example, command execution authority for an electronic device is only available to a user device associated with a current owner of the respective electronic device.

As depicted at 3B, a user device 104(1) may transfer its command execution authority for an electronic device 102 (2) to a second user device 104(2). As described elsewhere, this may involve communicating with either the mobile application server 108 or an ownership registry network 106. In embodiments in which the user device 104(1) communicates with the mobile application server 108, the mobile application server 108 may generate a transaction record which it may provide to the ownership registry network to be appended to a current ownership registry. In embodiments in which the user device 104(1) communicates with the ownership registry network 106, the user device 104(1) may generate a transaction record which it may provide to the ownership registry network 106 to be appended to a current ownership registry. The ownership registry network 106 may subsequently notify the mobile application server 108 of the transfer. As noted elsewhere, the transaction record may include a number of details related to the transferee (i.e., the user to whom command execution authority is being transferred) as well as an electronic signature. The electronic signature may be generated by the user device 104(1) using a private key associated with the user device 104(1) or it may be generated by the mobile application server 108 using a private key associated with the mobile application server 108 depending on which entity created the transaction record.

Once a transfer of command execution authority for an electronic device 102(2) to a second user device 104(2) has been completed, the mobile application server 108 may provide the device key corresponding to electronic device 102(2) (key 2) to the user device 104(2). In some embodiments, the mobile application server 108 may transmit instructions to the user device 104(1) which cause key 2 to be deleted from memory of the user device 104(1). In some cases, key 2 may be removed automatically from memory of the user device 104(1) upon completion of the transfer of command execution authority for the electronic device 102 (2). In this way, user device 104(2) may be made capable of issuing commands to electronic device 102(2) and user device 104(2) may be made incapable of issuing commands to electronic device 102(2). In some embodiments, upon completion of the transfer of command execution authority for the electronic device 102(2), the user device 104(2) may cause key 2 to be replaced or changed within the memory of the electronic device 102(2).

Figure 4:
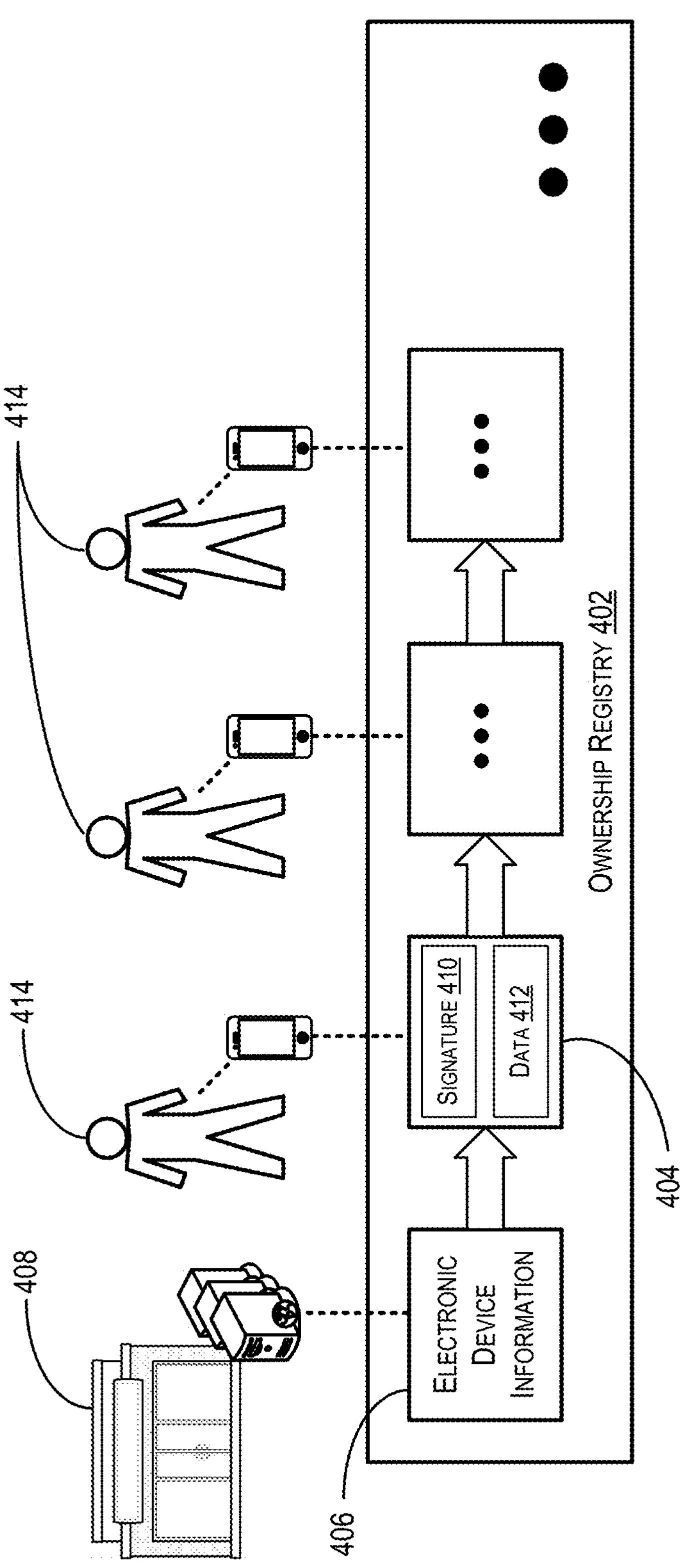
FIG. 4 depicts an example ownership registry that may be implemented in relation to an electronic device in accordance with at least some embodiments of the disclosure.

FIG. 4 depicts an example ownership registry that may be implemented in relation to an electronic device in accordance with at least some embodiments of the disclosure. In FIG. 4, an ownership registry 402, may comprise a record of transaction records 404 related to a particular item (e.g., an electronic device) which is distributed across a blockchain network. In some embodiments, the ownership registry 402 may comprise a blockchain ledger, in which a number of transaction records related to various item transactions are processed in a "block," the record of which is then distributed to a number of computing nodes of the blockchain network.

As described above, a number of transaction records 404 may be associated with an ownership registry 402. The ownership registry 402 may include electronic device information 406, which may be formatted as having at least an electronic device identifier. In some embodiments, the electronic device identifier may be generated using electronic device information provided via a user device (e.g., one of the user devices 104 described herein) or during an electronic device enrollment process. In some embodiments, the electronic device identifier may be generated according to a specified format using information related to the electronic device (e.g., one of the electronic devices 102 described herein). For example, the electronic device identifier may be generated as some combination of item type and serial number. In some embodiments, the electronic device information 406 included within the ownership registry 402 may be generated by a resource provider 408 that initially supplies, distributes, or sells (e.g., at retail) the electronic device (e.g., a merchant or manufacturer).

As users conduct transactions with respect to various electronic devices, user devices associated with those users may generate requests and transmit them to the ownership network to be added to the ownership registry. Upon verification of a new transaction record, that new transaction record may be generated and appended to the ownership registry 402. In some embodiments, each transaction record appended to the ownership registry 402 may include an electronic signature 410 that may be used to verify the authenticity of the transaction record. The transaction record 404 may also include transaction data 412. In some embodiments, the transaction data 412 included in a transaction record 404 may include information related to the transaction conducted, the user/users conducting the transaction, contact information for a user, a public cryptographic key associated with a user, or any other suitable information. In some embodiments, the electronic signature 410 may include a portion of the data 412 which has been obfuscated using a private cryptographic key associated with a user.

As transactions are conducted with respect to the ownership registry 402, a transaction record is generated for that transaction and appended to the ownership registry, such that the ownership registry may constitute an unalterable history of the ownership interests for a number of electronic devices. In some embodiments, the transaction record may be generated and signed by a user 414 and provided to an ownership registry network node, which adds the transaction record to the ownership registry 402. In some embodiments, transaction records may be generated by, and signed by, a mobile application server on behalf of users 414. For example, in some embodiments of the system described herein, a first user may provide an indication that an ownership interest in an electronic device currently associated with his or her account should be conveyed to a second user. In this example, the mobile application server may, upon authenticating the first and second users (e.g., via login credentials) generate a transaction record to be appended to the ownership registry 402.

As previously noted, each transaction record may be signed using a private key to create a signature 410 for the transaction record. In some embodiments, the transaction record may be signed by a mobile application server or a registry network node of the ownership registry network using a private key associated with the mobile application server or ownership registry network. In this way, the transaction record may be verified using a public key associated with the mobile application server or ownership registry network. In some embodiments, a transaction record may be signed by one of the parties 414 to a transaction (e.g., the current owner) using a private key associated with that party. In this way, the public key associated with the party may be obtained (e.g., from a repository of public keys or from a latest transaction record associated with the electronic device at issue) and used to verify the authenticity of the transaction record.

Figure 5:
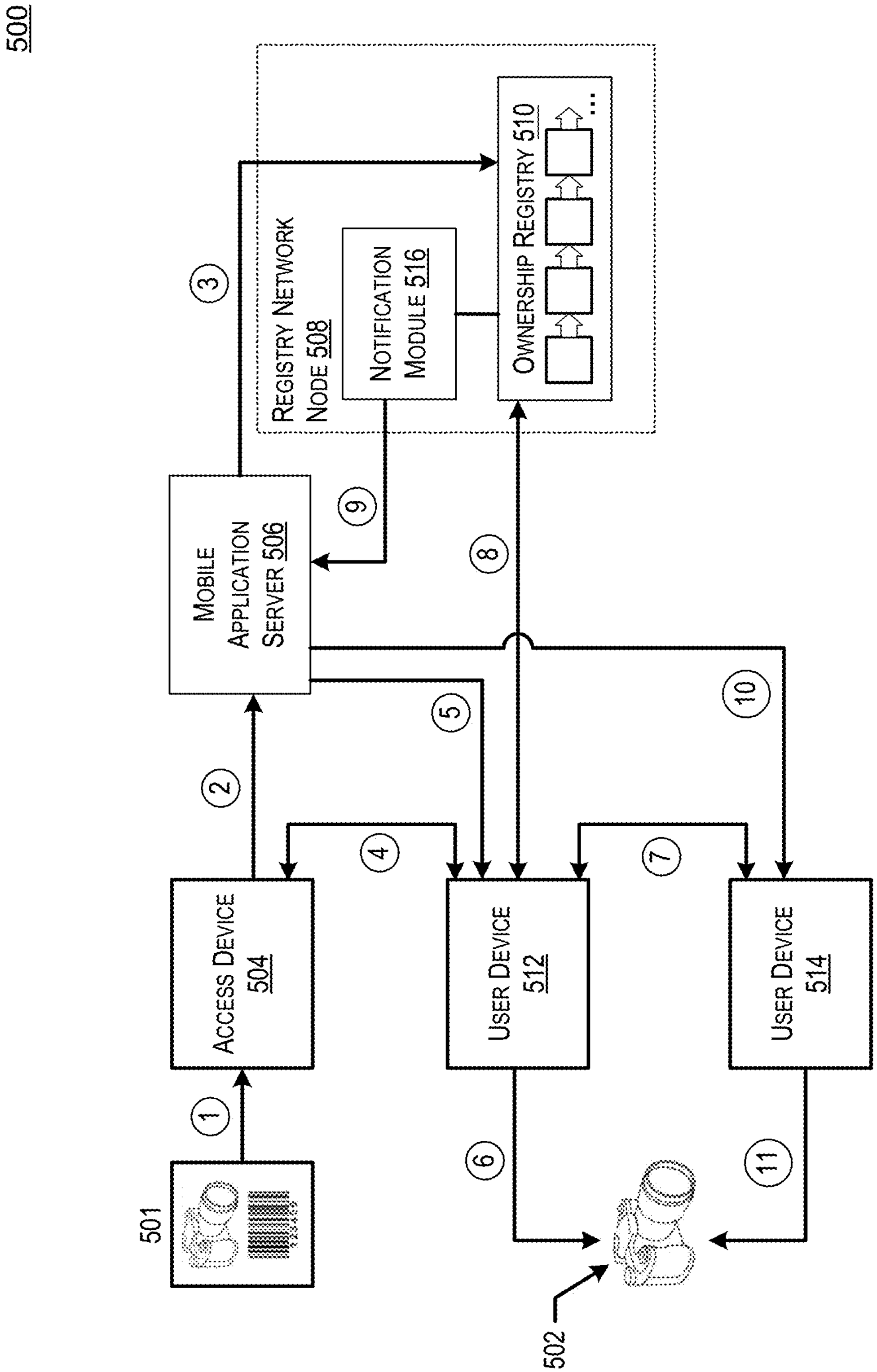
FIG. 5 depicts a process for transferring a device key between accounts in accordance with at least some embodiments.

FIG. 5 depicts a process for transferring a device key between accounts in accordance with at least some embodiments. Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least some of the components described in relation to FIG. 2. The code may be stored on a computer-readable storage medium, for example, in the form of a computer program including a plurality of instructions executable by one or more processors. The computer-readable storage medium may be non-transitory.

As depicted in step 1, the process 500 may involve receiving (e.g., via electronic, magnetic, or optical scanning) an indication 501 (e.g., a serial number, UPC, device identifier, bar code, QR code and/or image information) of an electronic device 502 at an access device 504. For example, a user may present an electronic device 502 for purchase at the access device 504(e.g., a point-of-sale (POS) device), and the access device 504 may determine (via scanning or otherwise) from the indication 501 which electronic device 502 is being purchased. The access device 504, upon receiving the indication 501 of the electronic device 502 may conduct a transaction in relation to the electronic device 502 to transfer an ownership interest in the electronic device 502 to the user.

Upon completing the transaction to transfer an ownership interest in the electronic device 502 to the user, the access device 504 may convey an indication of that transaction to a mobile application server 506 at step 2. In some embodiments, the access device 504 may provide a device identifier for the electronic device 502 as well as information related to the purchaser of the electronic device 502. The mobile application server 506, upon receiving this information, may identify a device key associated with the electronic device. In some embodiments, the mobile application server 506 may provide the device key to the access device 504 or another user device in vicinity of the access device 504. In these embodiments, the access device 504 may be configured to establish a connection with the electronic device 502 to unlock it using the provided device key.

As depicted at step 3, the mobile application server 506 may cause a registry network node 508 to append a transaction record to an ownership registry 510 indicating the transfer of ownership in the electronic device 502. In some embodiments, the mobile application server 506 may create an initial transaction record for the electronic device 502. In these embodiments, the existence of such a transaction record may be indicative of a valid sale of the electronic device.

A user device 512 associated with the purchaser of the electronic device may then be provided with a device key associated with the electronic device 502. In some embodiments, as depicted at step 4, the device key may be provided to the user device 512 by the access device 504. For example, the device key may be encoded within a machine-readable code which is printed on a receipt by the access device 504. In some embodiments, as depicted at step 5, the device key may be provided to the user device 512 by the mobile application server 506. For example, the access device 504 may provide information about the purchaser of the electronic device 502 to the mobile application server 506. The mobile application server 506 may then identify an account associated with the user based on the provided information. The mobile application server 506 may then provide the device key to the user device 512 via contact information stored in relation to the identified account. Upon receiving the device key, the user device 512 is able to provide commands to the electronic device 502 using the device key at step 6.

Process 500 may continue when the user associated with user device 512 decides to transfer to a second user his or her ability to issue commands to the electronic device 502. In some embodiments, the current user may collect information about the second user to be used in the transaction. This may involve an interaction at step 7 between the user device 512 and a second user device 514 operated by the second user in which information about the second user is obtained by the user device 512.

As depicted at step 8, the user device 512 may cause a new transaction record to be appended to the ownership registry 510 at step 8. In some embodiments, the transaction record may include an indication of the second user (and potentially a public cryptographic key associated with the second user). The transaction record may also include an electronic signature of the user associated with the user device 512 which can be used to verify the authenticity of the transaction record. In some embodiments, upon receiving the transaction record, the registry network node 508 may append the transaction record to the ownership registry upon verifying its authenticity.

Once the ownership registry 510 has been updated to include the new transaction record, a notification module 516 which monitors the ownership registry may notify the mobile application server 506 of the transaction at step 9. The mobile application server 506, upon being notified of the new transaction, may identify an account associated with the second user, and subsequently a user device 514 associated with that account. The mobile application server 506 may then provide the device key associated with the electronic device 502 to the user device 514 at step 10. Upon receiving the device key, the user device 514 is able to provide commands to the electronic device 502 using the device key at step 11.

Figure 6:
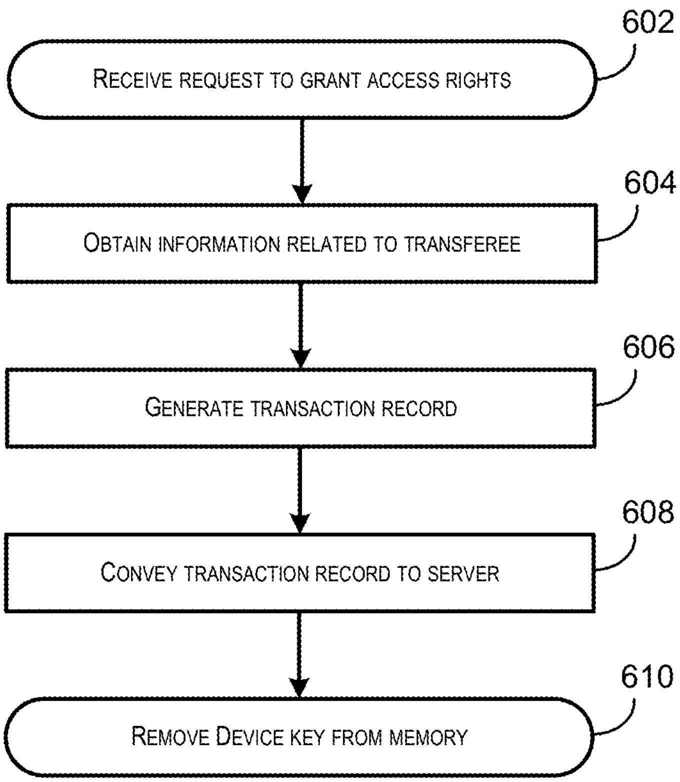
FIG. 6 depicts a flow diagram illustrating a process for granting access rights for an electronic device from a first user device to a second user device in accordance with at least some embodiments.

FIG. 6 depicts a flow diagram illustrating a process for granting access rights for an electronic device from a first user device to a second user device in accordance with at least some embodiments. The process 600 of FIG. 6 may be performed by at least the user device 104 described with respect to FIG. 2. More particularly, process 600 of FIG. 6 is depicted as being performed by a user device currently associated with the electronic device.

Process 600 may begin at 602 when a request is received at a first user device (e.g., a transferor user device) to grant access rights to an electronic device which is currently associated with the first user device.

At 604, the process 600 may involve obtaining information related to a second user (e.g., a transferee). The information related to the second user may include at least an identifier for the second user. In some embodiments, the information related to the second user may include a public cryptographic key associated with that second user or associated with an account maintained in relation to that second user. In some embodiments, the information associated with the second user may be received via manual input through a graphical user interface executed on the user device. In some embodiments, the information associated with the second user may be received from the second user device. For example, the information associated with the second user may be encoded within a machine-readable code by the second user device and may be received upon the user device scanning the machine-readable code. In a second example, the information associated with the second user may be transmitted from the second user device to the first user device using a wireless communication protocol.

At 606, the process 600 may involve generating a transaction record. In some embodiments, the transaction record may include at least a portion of the information related to the second user. In some embodiments, the transaction record may include at least an electronic signature generated using a private cryptographic key associated with the first user.

At 608, the process 600 may involve conveying the transaction record to a server. In some embodiments, the server may be a registry network node including a distributed database. In at least some of these embodiments the transaction record may be appended to a series of transaction records which represents an ownership registry. Such a series of transaction records may be a blockchain ledger. In some embodiments, the server may be a mobile application server which maintains accounts for a plurality of users. The second user device may be identified by virtue of being associated with an account maintained by a mobile application server in relation to the second user. In at least some of these embodiments, the mobile application server may record the transaction record within an ownership registry.

Prior to adding the transaction record to an ownership registry, the server may be caused to verify the transaction record. This may involve verifying that the first user device has authority to grant access rights for the electronic device as well as verifying the electronic signature. Verifying that the first user device has authority to grant access rights for the electronic device may involve determining that the operator of the first user device is a current owner of the electronic device. This may further involve identifying the latest transaction record in the ownership registry related to the electronic device and determining that it involves a transfer of ownership to the operator of the first user device. Verifying the electronic signature comprises applying a public cryptographic key associated with the first user to the electronic signature and comparing the result to the information associated with the second user included in the transaction record.

Upon verification of the transaction record, a device key associated with the electronic device may be caused to be provided to a second user device associated with the second user. The device key grants the access rights for the electronic device for the second user device.

At 610, the process 600 may optionally involve automatically removing the device key associated with the electronic device from a memory of the first user device. In some embodiments, this may be done upon receiving an indication that the transaction record has been successfully verified.

Figure 7:
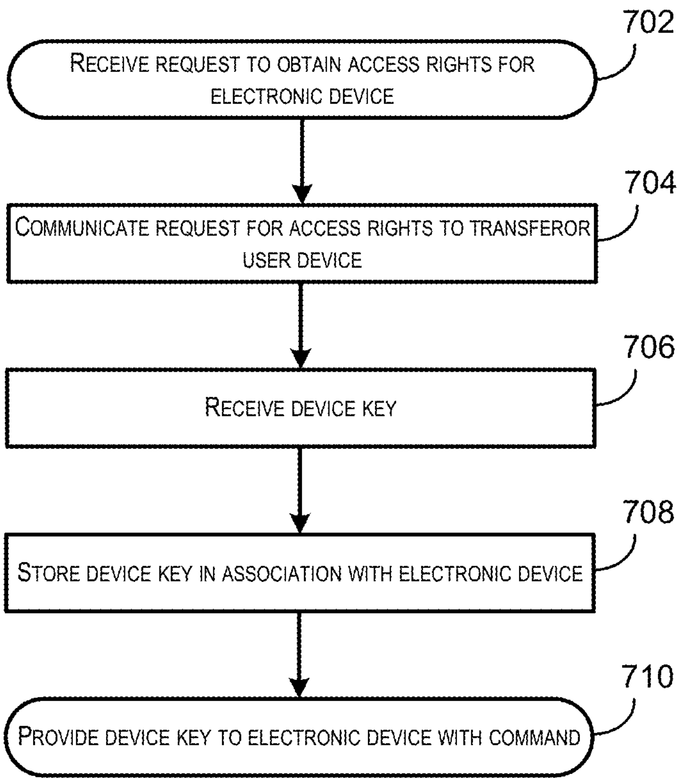
FIG. 7 depicts a flow diagram illustrating a process for obtaining access rights for an electronic device at a first user device from a second user device in accordance with at least some embodiments.

FIG. 7 depicts a flow diagram illustrating a process for obtaining access rights for an electronic device at a first user device from a second user device in accordance with at least some embodiments. The process 700 of FIG. 7 may be performed by at least the user device 104 described with respect to FIG. 2. More particularly, process 700 of FIG. 7 is depicted as being performed by a user device which seeks to obtain access rights for the electronic device.

Process 700 may begin at 702 when a request is received at a transferee user device to obtain access rights for an electronic device. In some embodiments, the request may be received from a user of the user device via a graphical user interface. For example, upon entering wireless communication range of an electronic device, the transferee user device may detect the electronic device. The user may be made capable of selecting an option to purchase or rent the electronic device via a graphical user interface executed on the transferee user device and a request to purchase or rent may be received by the transferee user device upon a user making such a selection.

At 704, the process 700 may involve communicating a request for access rights to a transferor user device. In some embodiments, the request is communicated directly between the transferee user device and the transferor user device. In some embodiments, the request is communicated first by the transferee user device to a mobile application server, and the mobile application server then forwards the request to the transferor user device upon identifying the transferor user device as being currently associated with the electronic device.

At 706, the process 700 may involve receiving a device key associated with the electronic device. In some embodiments, the device key may be included within an encrypted packet of data, the encrypted packet of data being accessible by the electronic device. In other words, the transferee user device may be prevented from accessing the device key stored in the encrypted packet. In some embodiments, the encrypted packet of data may include at least one dynamic data element. For example, the at least one dynamic data element may be a counter value which is increased or decreased with each grant of access rights. In this example, commands accompanied by an encrypted packet that include a counter value less than or greater than a current counter value stored in the electronic device may not be executed even if the encrypted packet includes a valid device key. In another example, the at least one dynamic data element may include a device identifier for the transferee user device. In this example, commands issued by a user device whose identifier does not match the device identifier for the transferee user device may not be executed even if the encrypted packet includes a valid device key.

At 708, the process 700 may involve storing the received device key in local memory. In some embodiments, the user device may have stored in local memory a number of different device keys, with each device key mapped to a corresponding electronic device (e.g., via an electronic device identifier).

At 710, the process 700 may involve, upon receiving instructions to issue a command to the electronic device, providing the command to the electronic device after confirming to the electronic device that the user device has the corresponding device key, or by providing the corresponding device key along with the command. As described elsewhere, the device key may be provided to the electronic device within an encrypted packet which can be decrypted by the electronic device using a cryptographic key stored in memory of the electronic device.

Embodiments of the disclosure provide for a number of technical advantages over conventional systems. In particular, embodiments of the described system enable access rights for an electronic device (enabled via a device key) to be transferred between accounts automatically and with minimal effort on behalf of either the transferor or the transferee. Additionally, each party to the transaction is able to remain relatively anonymous to the other party while ensuring that the transfer of access rights can be conducted in a secure manner. The system also ensures that access rights are granted quickly and without the risk that a user will fail to provide those access rights. Additionally, some embodiments also prevent a previous owner from keeping access rights to the electronic device after having sold the electronic device, which can also prevent the previous owner from effectively re-selling the previous sold electronic device to another party. The system provides a clear chain of title that can be used to verify both current ownership and that an electronic device has not been unlawfully obtained.

Furthermore, in some embodiments of the system described herein, a transfer of access rights to an electronic device between users can occur without those two users needing to meet up. For example, a user in the vicinity of the electronic device may detect the electronic device via a short-range communication protocol in his or her user device. Upon detecting the presence of such an electronic device, the user may decide to initiate a purchase or rental of the electronic device by submitting a request to a remote server. The remote server can then forward the request to the current owner of the electronic device and that user can grant or deny the request without ever needing to meet with the requestor.

Figure 8:
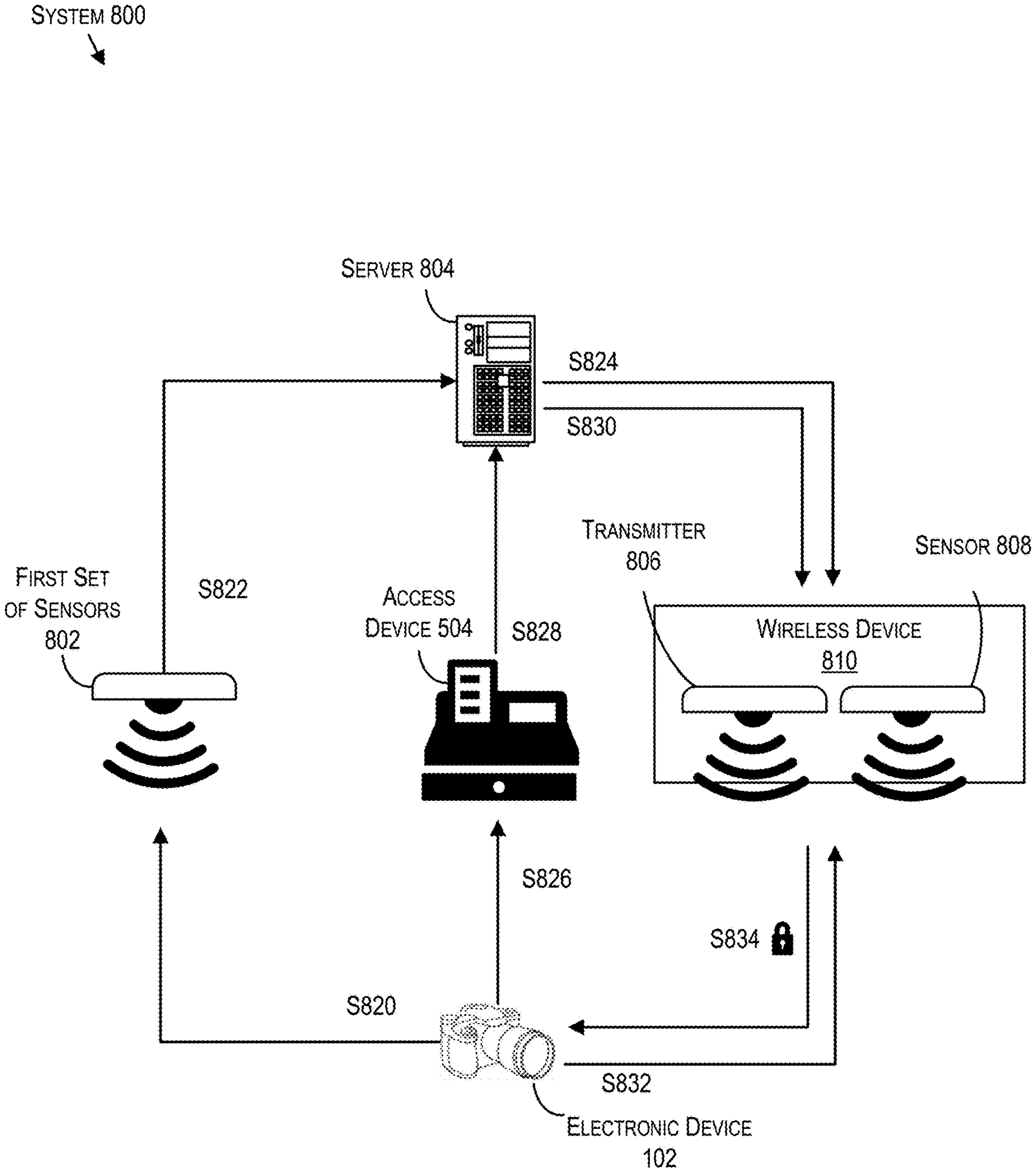
FIG. 8 depicts an illustrative overview of an example system in which a command may be sent to an electronic device based on whether a transaction was performed relating to the electronic device in accordance with at least some embodiments.

FIG. 8 depicts an illustrative overview of an example system 800 in which a command may be sent to an electronic device 102 based on whether a transaction was performed relating to the electronic device 102 in accordance with at least some embodiments. The electronic device 102 may be in an enabled state that permits use of at least one functionality of electronic device 102. The electronic device 102 may remain in the enabled state until a command is transmitted to the electronic device 102 to be put into a locked state that prevents the at least one functionality of electronic device 102. Electronic device 102 may be instructed to be put into the locked state if a transaction relating to electronic device 102 has not occurred when the electronic device 102 is in proximity to a boundary. The instruction to put the electronic device 102 into a locked state may be forgone if a transaction relating to the electronic device 102 has not occurred when the electronic device 102 is in proximity to a boundary.

In certain examples, system 800 may be used by a brick-and-mortar retail store. For example, electronic device 102 may be a power tool positioned on a shelf in the store. The electronic device 102 may be in an unlocked state. The electronic device 102 may be placed on the shelf within range of a sensor in the first set of sensors 802. When the electronic device 102 is picked up and moved (e.g., by a customer), the sensor may detect that the location of the electronic device 102 has changed (e.g., the customer is walking away with the electronic device 102). The sensor may communicate that the electronic device 102 has changed locations to the server 804, the access device 504, and/or the wireless device 810. The wireless device 810 may be placed near a boundary of the retail store and therefore if the electronic device 102 is brought within proximity to the boundary, the wireless device 810 may detect that the electronic device 102 is within proximity to the boundary. The boundary may be located near one or more exits of the store, a department of the store, or area near the store (e.g., parking lot). The wireless device 810 can then determine if the electronic device 102 is to be instructed to be locked. The wireless device 810 may determine if the electronic device 102 is to be instructed to lock based on determining if a transaction between the access device 504 and the electronic device 102 has taken place. The wireless device 810 may have already received an indication that the transaction has occurred from the access device 504 or the server 804, or the wireless device 810 may request such information after determining the electronic device 102 is within communication range from the wireless device 810, such as when the electronic device 102 is being carried out of the store by the customer. In a case where the customer did not purchase the electronic device 102, the electronic device 102 may be instructed to be locked by the wireless device 810. In a case where the electronic device 102 was purchased by the customer, the wireless device 810 may forgo sending the lock command and leave the electronic device 102 in the unlocked state.

The system 800 can include the electronic device 102, a first set of sensors 802, a server 804, an access device 504, and a wireless device 810. System 800 can be used to detect whether the electronic device 102 is near a boundary or leaving a boundary and cause a command to be transmitted to the electronic device 102 if a transaction associated with the electronic device 102 has not occurred.

The electronic device 102 may have a functionality and be any suitable device that accomplishes its purpose electronically. The electronic device 102 may have installed within it an electronic circuit which enables it to be changed to a locked state that denies use of at least one aspect of the electronic device's functionality and/or an unlocked state that permits use of at least one aspect of the electronic device's functionality.

The electronic device 102 may comprise an electronic device identifier. The electronic device identifier may uniquely identify the electronic device 102. The electronic device identifier may be stored in memory of the electronic device 102 and/or physically represented by a barcode, serial number, or other physical identifier of the electronic device 102.

The electronic device 102 may comprise a receiver and/or a transmitter. The receiver and transmitter can be separate components or may be the same component (e.g., a transceiver). The receiver may receive a first signal from a transmitter, the wireless device 810, the access device 504, a user device, or another device. The signal received by the receiver of the electronic device 102 may request information from the electronic device 102 such as the electronic device identifier. The transmitter may transmit a second signal from the electronic device 102 to the first set of sensors 802, the wireless device 810, the access device 504, the user device, or another device. The signal transmitted by the transmitter may be transmitted in response to the first signal received by the electronic device 102. The signal transmitted by the transmitter may be transmitted periodically, may be broadcast, or may be sent to a specific device (e.g., a wireless device including a sensor in the first set of sensors). In certain embodiments, the transmitter transmits a signal after movement of the electronic device has been detected (e.g., using an accelerometer).

In certain embodiments, the electronic device 102 includes an antenna and a Radio Frequency Identification (RFID) tag connected to the antenna. The antenna may be used to receive Radio Frequency (RF) signals from an RFID reader included as part of a wireless device. The wireless device may include a first sensor included in the first set of sensors 802 and/or a sensor 808 included in the wireless device 810. The received RF signals can cause the RFID tag to transmit (e.g., using the antenna) data (e.g., the electronic device identifier). In certain embodiments, Bluetooth low energy (BLE), Wi-Fi, or Zigbee is used. The electronic device 102 has been further described with respect to other figures, above.

The first set of sensors 802 may include one or more sensors. The first set of sensors 802 may be included in one or more devices with wireless communication capabilities (e.g., a wireless device). The one or more devices, one or more transmitters transmitting to the electronic device, and/or a sensor in the first set of sensors 802 may be capable of communicating using RF, Bluetooth Low Energy (BTLE), Wi-Fi, Zigbee, or other wireless communication techniques. The one or more devices may be capable of communicating using a wired connection. The one or more devices may communicate with one or more sensors in the first set of sensors 802, the electronic device 102, and/or the server 804. A sensor in the first set of sensors 802 may be communicatively coupled with the server 804.

A sensor in the first set of sensors 802 may include a receiver. The receiver can be included in a transceiver. The receiver can be included in a RFID reader device. The receiver may receive the second signal from the electronic device 102. The second signal may be broadcast from the electronic device 102 or sent to a specified receiver. A first signal transmitted from a transmitter (e.g., a RFID reader) may have caused the electronic device 102 to transmit the second signal. The receiver may receive the second signal from the electronic device 102 periodically, after a signal is received by the electronic device 102, and/or after the electronic device 102 has been moved. The second signal may indicate the electronic device identifier, how far the electronic device 102 is from the receiver, and/or whether the electronic device 102 is in a locked state. One of ordinary skill in the art with the benefit of the present disclosures would recognize that any information capable of being obtained or accessed by the electronic device 102 may be transmitted to a sensor in a set of one or more sensors (e.g., the first set of sensors 802, the sensor 808).

In certain embodiments, the sensor includes a light sensor (or other optical sensor), a weight sensor, an induction sensor, a Light Detection and Ranging (LIDAR) sensor, a camera, or other sensor capable of being used to determine if the electronic device 102 has moved. For example, the light sensor may be placed below or behind electronic device 102 such that when electronic device 102 is picked up, the sensor can send a third signal indicating electronic device 102 has moved.

After one or more sensors of the first set of sensors 802 determine that electronic device 102 has moved, the third signal may be transmitted from the one or more sensors or a device (e.g., a wireless device) including a sensor in the one or more sensors of the first set of sensors 802 to the server 804. The third signal transmitted from one or more sensors of the first set of sensors 802 to the server 804 may be transmitted via a wireless and/or wired connection.

The server 804 may be made up of any computer or cluster of computers. For example, the server 804 can be a large mainframe, a minicomputer cluster, or a group of servers functioning as a unit. The server 804 may be coupled to a database and may include any hardware, software, other logic, or combination of the preceding for servicing the first set of sensors 802, the wireless device 810, a transmitter, and/or the access device 504. The server 804 may comprise one or more computational apparatuses and may use any of a variety of computing structures, arrangements, and compilations for receiving and transmitting signals.

The server 804 may receive the third signal originating from the first set of sensors 802. The third signal caused by the first set of sensors 802 may indicate that a location (e.g., proximate, precise) of the electronic device has changed, the location (e.g., proximate, precise) of the electronic device 102, an identifier of the electronic device 102, whether electronic device 102 is in a locked state or an unlocked state, and/or a time.

The server 804 may receive a fourth signal from the wireless device 810. The fourth signal from the wireless device 810 may indicate a location (e.g., proximate, precise) of the electronic device 102, an identifier of the electronic device 102, a state of the electronic device 102(e.g., locked or unlocked), and/or a time.

The server 804 may receive transaction signals from the access device 504. The transaction signal from the access device 504 may indicate a location (e.g., proximate, precise) of the electronic device 102, an identifier of the electronic device 102, a state of the electronic device 102(e.g., locked or unlocked), transaction details, an identifier of the access device 504, a location of the access device 504, and/or a time.

Based on the signals (e.g., lack of signals) received from the access device 504 and/or the first set of sensors 802, the server 804 may store an indication that the electronic device 102 is to be put into a locked state that prevents use of the at least one aspect of the functionality of the electronic device 102. In an example, based on the lack of a signal received from the access device 504 indicating the electronic device 102 was purchased, the server 804 may store an indication that the electronic device 102 is to be put into a locked state. In an example, based on the combination of a lack of a signal received from the access device 504 indicating the electronic device 102 was purchased and a signal received from a sensor of the set of sensors 802 indicating the electronic device 102 has changed location, the server 804 may store an indication that the electronic device 102 is to be put into a locked state. The server 804 may associate the indication with an identifier of the electronic device 102. The server 804 may further associate with the identifier of the electronic device 102, a time to live (examples of which are described hereinafter), a type of transaction that occurred in association with the electronic device 102, when a sensor last detected the electronic device 102, or any other information received from the first set of sensors 802, the wireless device 810, and the access device 504 in relation to the electronic device 102.

The server 804 may transmit a fifth signal to the wireless device 810 indicating the electronic device 102 is to be put into a locked state (e.g., after the first set of sensors 802 has detected movement of the electronic device 102 and before the access device 504 conducts a transaction associated with the electronic device 102). Server 804 may transmit the fifth signal to the wireless device 810 indicating electronic device 102 is not to be put into a locked state and/or that the wireless device 810 should forgo sending a command to electronic device 102 to put the electronic device into a locked state (e.g., after the access device 504 conducts a transaction associated with the electronic device 102). In certain embodiments, the server 804 transmits the fifth signal to the wireless device 810 upon receiving a request from the wireless device 810 requesting the fifth signal for the electronic device 102(e.g., the request may include the device identifier of the electronic device 102). In certain embodiments, the server 804 transmits the fifth signal to the wireless device 810 upon receiving an indication from the access device 504 indicating a transaction associated with the electronic device 102 has been performed.

The access device 504 may be the access device 504 described herein above. The access device 504 may receive (e.g., via electronic, magnetic, or optical scanning) an electronic device identifier (e.g., via a serial number, UPC, bar code, QR code and/or image information). For example, a user may present the electronic device 102 for purchase at the access device 504 (e.g., a point-of-sale (POS) device), and the access device 504 may determine (via scanning or otherwise) the electronic device 102 is being purchased. The access device 504, upon receiving the electronic device identifier of the electronic device 102 may conduct a transaction in relation to the electronic device 102(e.g., to transfer an ownership interest in the electronic device 102 to the user). The transaction may be an ownership or rental transaction.

Access device 504 may transmit transaction information to the server 804. The transaction information may include an indication that an electronic device 102 was involved in a transaction (e.g., purchased, rented), a device identifier of the electronic device 102, the location of the electronic device 102, an identifier of the access device 504 that conducted the transaction, and/or a time the transaction occurred. Based on the transaction information, the server 804 and/or the wireless device 810 may cause the electronic device 102 to remain in the unlocked state or change into a locked state.

Wireless device 810 may include a sensor 808 and may include one or more additional sensors. The wireless device 810 may include a transmitter 806 and may include one or more additional transmitters. Wireless device 810 may be configured to communicate via a wireless and/or wired connection with server 804. In certain embodiments, wireless device 810 may communicate directly (via a wireless and/or wired connection) with the access device 504. The wireless device 810 may communicate with the electronic device 102 using the transmitter 806 and/or the sensor 808. The wireless device 810 may communicate with the electronic device 102 using RF, BTLE, Wi-Fi, Zigbee, or other wireless communication techniques. The sensor 808 may determine a location of the electronic device 102. Sensor 808 may receive a signal from the electronic device 102 when electronic device 102 is in a proximity to the boundary. Sensor 808 may receive a signal from server 804 and/or access device 504 that indicates whether the electronic device 102 should remain in an unlocked state or put into a locked state if sensed by sensor 808. Sensor 808 may receive a signal from the electronic device 102 when electronic device 102 is in a proximity to the boundary. The transmitter 806 may transmit the location of electronic device 102 to the server 804 and/or transmit a command to electronic device 102. The wireless device 810 may be capable of accessing memory. The memory may be the memory of the wireless device 810 and/or the server 804. The memory may include device identifiers for devices to be put into a locked state.

The server 804, the first set of sensors 802, the access device 504, and the wireless device 810 may be located within wireless communication range of one another or many communicate over a network (e.g., using wireless and/or wired communication). The server 804, the first set of sensors 802, the access device 504, and the wireless device 810 may be in the same boundary, store, city, state, country, etc. as one or more of the other devices (e.g., server 804 may be remote from the wireless device 810).

By way of illustrating interactions between various components of system 800 described herein, consider the following scenario. In the illustrated scenario, the electronic device 102 may be taken from a shelf within a boundary (e.g., a store) and brought within proximity of the boundary (e.g., outside of the store). Upon electronic device 102 being in proximity of the boundary, electronic device 102 may receive a command to put the electronic device 102 into a locked state depending on if electronic device 102 is associated with a transaction (e.g., been purchased). Electronic device 102 may be in an unlocked state that permits use of at least one aspect of the functionality of the electronic device 102 while the electronic device 102 is within the boundary and/or before the electronic device 102 is taken within proximity of the boundary.

At S820, electronic device 102 may be moved from a location. For example, the electronic device 102 may have been picked up and carried away from a shelf that the electronic device 102 was resting on. The first set of sensors 802 may receive a tracking signal from the electronic device 102 when electronic device 102 is within range of the first set of sensors 802. The tracking signal may indicate how close the electronic device is to the first set of sensors 802. The first set of sensors 802 may receive a tracking signal from one or more electronic devices within range of a sensor of the first set of sensors 802. The tracking signal from electronic device 102 may include an identifier of the electronic device 102. The tracking signal may be received from electronic device 102 periodically, based on electronic device 102 determining it has been moved, and/or responsive to a message received from a transmitter device (e.g., an RFID reader).

At S822, one or more sensors in the first set of sensors 802 may transmit a first signal to the server 804. The first signal may be transmitted to server 804 in response to determining that a location of electronic device 102 has changed and indicate the location of electronic device 102 has changed. The first set of sensors 802 may determine the location of electronic device 102 has changed based on the tracking signal from electronic device 102 that indicates electronic device 102 has been moved. In certain embodiments, the first set of sensors 802 may determine the location of electronic device 102 has changed when electronic device 102 is no longer within range of the first set of sensors 802, is a certain distance away from one or more sensors in the first set of sensors 802, and/or no longer responds to a message from a transmitter. For example, electronic device 102 may not respond to a message transmitted by an RFID reader that previously obtained a first response from electronic device 102. The lack of a second response from electronic device 102 subsequent to the first response from electronic device 102 can indicate that the location of electronic device 102 has changed.

Upon receiving the first signal from the first set of sensors 802, the server 804 may store, based on the first signal, an indication that the electronic device 102 is to be put into a locked state that prevents use of the at least one aspect of the functionality. The indication may be stored in memory of the server 804 and/or memory of the wireless device 810.

In certain embodiments, the memory may further store a time to live associated with the electronic device identifier. The time to live may indicate how long the electronic device 102 has been out of range of the first set of sensors, how long the electronic device 102 first became out of range of the first set of sensors, and/or how much longer the memory should store the electronic device identifier.

Upon the time to live expiring, the electronic device identifier may be removed from the memory. The time to live may be refreshed and/or incremented when another signal is received from the first set of sensors 802 which may indicate that the electronic device 102 is still moving around and is within the boundary. In certain embodiments, the time to live is not refreshed if the same sensor from the first set of sensors 802 senses the electronic device 102. For example, the electronic device 102 may have been placed back down on the original shelf or another shelf and the electronic device identifier is not to be retained in the memory. In certain embodiments, after the time to live expires, a notification may be transmitted from server 804 to a user device (e.g., user device used by an employee of a store) to notify the user of the user device that electronic device 102 has been moved and is somewhere within the boundary. In certain embodiments, the notification may include information about where the electronic device 102 was last sensed. Information about where the electronic device 102 was last sensed may be useful to help place the electronic device 102 back at a designated location (e.g., in a defined shelf location). Removing the electronic device identifier and associated information from memory upon expiration of the time to live can limit the electronic device identifiers stored in memory to the electronic device identifiers for electronic devices 102 that are more likely to come within range of boundary and/or wireless device 810 (e.g., electronic devices 102 that are not on a shelf, electronic devices 102 that are moving, electronic devices 102 that are in a cart, etc.). Embodiments including a time to live associated with the electronic device identifier can reduce memory consumption and reduce the computation resources used when searching for a device identifier in the memory.

In certain embodiments, a time to live is not used and when the electronic device 102 is sensed by a sensor in the first set of sensors 802 consistently for a period of time (e.g., over a set of two or more broadcasts, over a two minute period, over a ten minute period, over an hour period, etc.), the electronic device identifier is caused to be removed from the memory. When the electronic device 102 is sensed by the sensor in the first set of sensors 802 consistently for the period of time, the electronic device 102 may have been placed down (e.g., where the electronic device 102 was originally picked up from or somewhere else). In certain embodiments, after the electronic device 102 is sensed by the sensor in the first set of sensors 802 consistently for the period of time, a notification (e.g., like the one that can be transmitted upon a time to live expiring) may be transmitted from the server 804 to a user device (e.g., user device used by an employee of a store) to notify a user (e.g., employee) that the electronic device 102 has been moved and is somewhere within the boundary. The notification may indicate a specific area where the electronic device 102 is located as indicated by the sensor of the first set of sensors 802 that has consistently sensed the electronic device 102. Removing the electronic device identifier and associated information from memory can limit the electronic device identifiers stored in memory to the electronic device identifiers for electronic devices 102 that are more likely to come within range of boundary and/or wireless device 810 (e.g., electronic devices 102 that are not on a shelf, electronic devices 102 that are moving, electronic devices 102 that are in a cart, etc.). Embodiments where the electronic device identifier is removed from the memory after a period of time can reduce memory consumption and reduce the computation resources used when searching for a device identifier in the memory.

At S824, the server 804 may transmit the identifier of the electronic device 102 to a wireless device 810 and/or additional wireless devices within communication range of the boundary. The wireless device 810 may include a sensor 808 and any number of additional sensors. The wireless device 810 may be used to monitor whether a second signal including the identifier of the electronic device 102 indicating the electronic device 102 is within proximity to the boundary is received by the sensor 808 from the electronic device 102. The wireless device 810 may retain a list of electronic device identifiers in memory that if sensed by sensor 808 will cause the wireless device 810 to transmit a command to the electronic device 102 to put the electronic device 102 into the locked state.

At S826, the access device 504 may conduct a transaction associated with the electronic device 102. The access device 504 may determine an electronic device identifier of the electronic device 102 during the transaction. The access device 504 may obtain the device identifier of the electronic device 102 from a barcode of the electronic device 102 or via another reading of information from the electronic device 102. In certain embodiments, the access device 504 may obtain the device identifier of the electronic device 102 by receiving the second signal from the electronic device 102 that includes the device identifier. For example, an RF signal may be sent from the electronic device 102 to the access device 504 responsive to a RFID reader of the access device 504 transmitting a third signal to a RFID tag of the electronic device 102.

At S828, the access device 504 may transmit the device identifier of the electronic device 102 to the server 804. The receipt of the device identifier of the electronic device 102 from the access device 504 may indicate to the server 804 that a transaction was performed associated with the electronic device 102. In certain embodiments, other information is additionally transmitted from the access device 504 to the server 804, such as the type of the transaction, purchase method information, time of purchase, access device identifier, access device location, etc. In certain embodiments, the access device 504 may transmit the device identifier to memory accessible by the wireless device 810. The wireless device 810 may be capable of sending a command to electronic device 102 in proximity to the boundary in addition to or alternatively to transmitting the device identifier to server 804.

At S830, server 804 may transmit a fourth signal including the device identifier to the memory accessible by the wireless device 810. The fourth signal may further include an indication that the transaction associated with the electronic device has occurred. The fourth signal may cause the electronic device identifier to be removed from memory accessible by the wireless device 810 and/or cause the transmitter 806 to forgo sending a command to the electronic device 102 that would put the electronic device 102 into a locked state.

At S832, the wireless device 810 may receive the fifth signal from the electronic device 102. The fifth signal may indicate the electronic device 102 is within proximity to the boundary. In certain embodiments, the fifth signal from the electronic device 102 is received in response to a previous signal sent to the electronic device 102 from the transmitter 806 or another transmitter.

After receiving the fifth signal from the electronic device 102, the wireless device 810 may determine whether to transmit a command to the electronic device 102 to put the electronic device 102 into the locked state. The wireless device 810 may access memory (e.g., of the server 804, of the wireless device 810) to determine if a transaction associated with the electronic device 102 occurred. If a transaction has occurred, the wireless device 810 may forgo sending of the command. If the transaction has not occurred, the process may continue onto S834.

At S834, the command may be transmitted by the wireless device 810 to the electronic device 102 to put electronic device 102 into the locked state. In certain embodiments, the wireless device 810 signs a message (e.g., the command) with a private key of a keypair and the electronic device 102 complies with the command if the electronic device 102 verifies, using a public key of the keypair, the wireless device 810 as the signing device.

Figure 9:
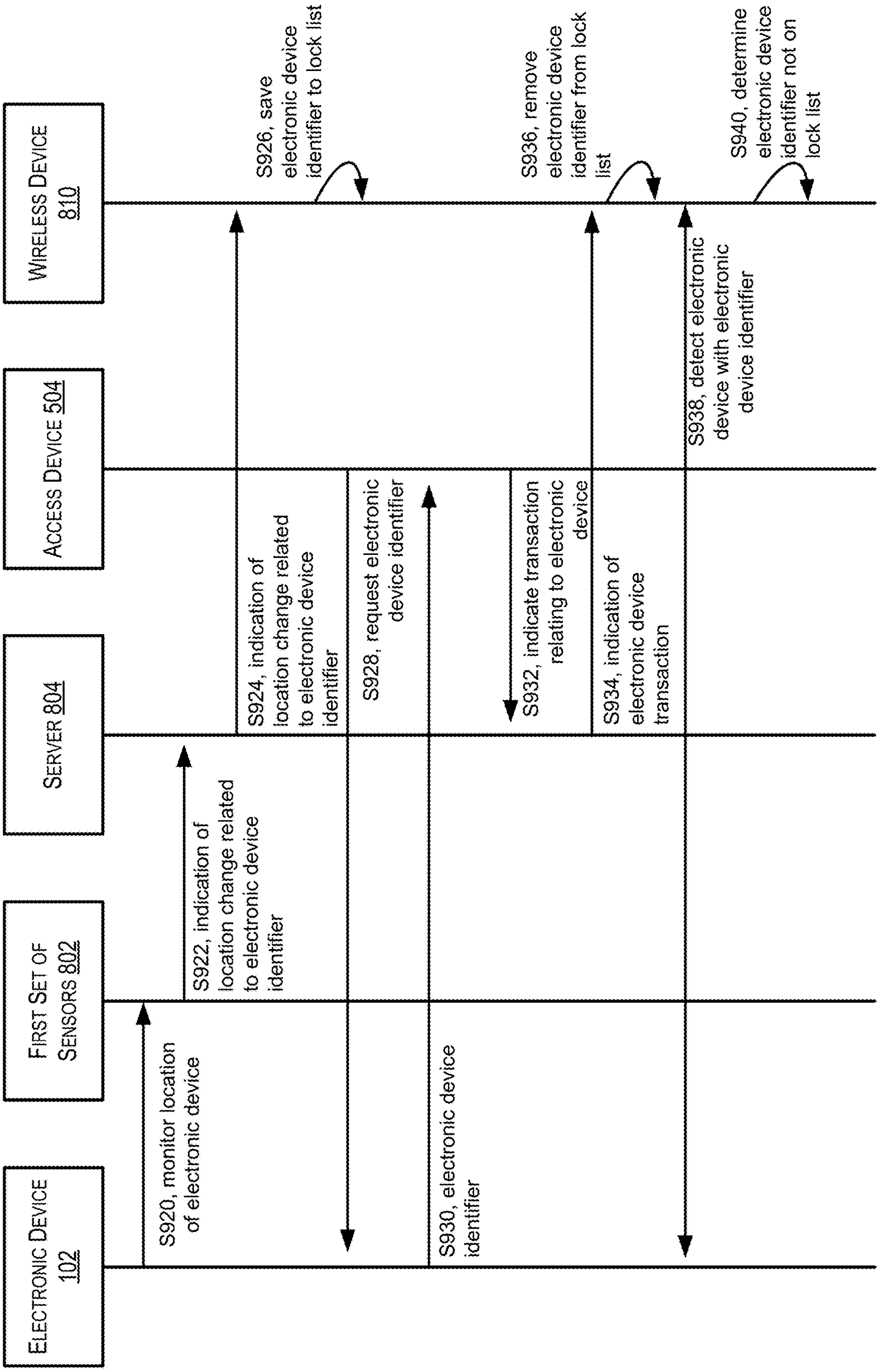
FIG. 9 depicts a diagram illustrating a process that forgoes sending a command to an electronic device based on the location of the electronic device in accordance with at least some embodiments.

FIG. 9 depicts a diagram illustrating a process that forgoes sending a command to an electronic device 102 based on the location of the electronic device 102 in accordance with at least some embodiments. The diagram includes a system comprising the electronic device 102, a first set of sensors 802, a server 804, an access device 504, and a wireless device 810.

At S920, the first set of sensors 802 may receive a first signal indicating that a location of the electronic device has changed. The electronic device may be the electronic device 102 described above, include functionality, and be in an unlocked state that permits use of at least one aspect of the functionality.

The electronic device may have sent a message to one or more sensors in the first set of sensors 802 that indicated the electronic device was being moved or is within a range of a transmitter. One or more sensors in the first set of sensors 802 may determine when the electronic device 102 has changed locations after a signal is not received by the electronic device 102 after a transmitter sends a signal, after the electronic device 102 has not sent a message to a sensor in the first set of sensors 802 for a predetermined amount of time (e.g., the electronic device is out of range of one or more sensors of the first set of sensors 802), or when the electronic device sends a message to a sensor in the first set of sensors 802 that represents movement of the electronic device (e.g., based on sensors in the electronic device, based on distance from a transmitter). The first set of sensors 802 may include sensors such as cameras, RF receivers, and other sensors described above.

In certain embodiments, the first set of sensors 802 includes a RFID sensor. The RFID sensor may be configured to transmit a signal that causes an RFID tag of the electronic device 102 to transmit a response. The response may include an identifier of the electronic device and/or other information the electronic device 102 is capable of storing, generating, and/or determining.

In certain embodiments, one or more sensors of the set of sensors 802 monitor the location of more than one electronic device 102. For example, a sensor in the first set of sensors 802 may monitor the location of multiple electronic devices in a given range, area, and/or view from the sensor.

At S922, one or more sensors of the first set of sensors 802 may transmit a message to the server 804. The message may include an identifier of the electronic device 102. The identifier may be obtained by the set of sensors 802 from the electronic device 102 according to the techniques disclosed herein (e.g., using an RFID reader to cause the electronic device 102 to transmit the device identifier to one or more sensors in the first set of sensors 802). The message may further include when the electronic device 102 was moved, where one or more sensors of the first set of sensors 802 are located, the state (e.g., locked, unlocked) of the electronic device 102, or any other information capable of being generated, obtained, and/or stored by the first set of sensors 802.

The message may indicate that the electronic device 102 has moved locations (e.g., has been picked up by a user, shopper, etc.). The server 804 may store the device identifier in memory. The server 804 may associate the device identifier with an indication that the electronic device 102 is to be locked if detected within proximity to a boundary. The locked state can prevent use of the at least one aspect of the functionality. Server 804 may store the device identifier and/or the indication that the electronic device 102 is to be locked if detected within proximity to a boundary in memory local to the server 804 and/or memory remote to the server 804.

In certain embodiments, the server 804 stores the device identifier in memory and associates the device identifier with a time to live. The time to live can indicate how long to store the device identifier in memory. The time to live may be increased when a signal indicates a location of the first electronic device 102 has changed after the location change detected by one or more sensors of the first set of sensors 802. The time to live may enable a server to remove the device identifier from memory (e.g., of the server 804, of the wireless device 810) if the electronic device 102 is not within proximity to the boundary and has stopped changing location. For example, if the electronic device 102 is put back onto a shelf.

At S924, the server 804 may transmit the device identifier to the wireless device 810 to be stored in memory of the wireless device 810. The wireless device 810 may be within communication range of the boundary. In certain embodiments, the server 804 transmits other information to the wireless device 810 that is associated with the device identifier such as the time to live, the type of electronic device 102(e.g., power drill, tablet, power saw) and/or an indication to lock the electronic device 102 if the electronic device 102 is sensed within communication range of the boundary. In certain embodiments, the transmission of the device identifier from the server 804 to the wireless device 810 may act as an indication to lock the electronic device 102 if the electronic device 102 is sensed within communication range of the boundary.

In certain embodiments, the wireless device 810 maintains a time to live independent of a time to live that may be maintained by the server 804 so that the device identifier can be removed from memory of the wireless device 810 after the time to live expires. The time to live may be increased, reset, or changed based on subsequent signals being received from the server 804(e.g., indicating a location of the electronic device 102 has changed).

At S926, the wireless device 810 may save the device identifier to memory. Saving the device identifier to memory may indicate that the electronic device 102 is to be locked if sensed within communication range of the boundary. The memory may include a lock list that associates device identifiers with an indication to lock the electronic device 102 identified by the device identifier.

Maintaining the list of electronic devices in memory in close proximity to the wireless device 810 may enable low latency between sensing an electronic device 102 in proximity to the boundary and sending a command from the wireless device 810 to the electronic device 102 to cause the electronic device 102 to be put into a locked state.

In certain embodiments, memory of the server 804 and/or the wireless device 810 maintains a list of electronic devices to be locked if they are sensed near the boundary. In certain embodiments, memory of the server 804 and/or the wireless device 810 maintains a list of electronic devices that are not to be locked if they are sensed near the boundary.

At S928, a transaction may be conducted by the access device 504 and associated with the electronic device 102. The transaction may be a purchase, rental, or other transaction associated with the electronic device 102. In certain embodiments, the access device 504 may send a signal to the electronic device 102 that causes the electronic device 102 to transmit an electronic device identifier to the access device 504. In certain embodiments, the access device 504 may use a scanner or other sensor to obtain a device identifier from the electronic device 102 without the electronic device 102 transmitting a signal to the access device 504. The access device 504 may obtain the electronic device identifier from the electronic device 102 via user input received at a user interface of the access device 504(e.g., serial number input).

At S930, the access device 504 may obtain the device identifier based on a signal received from the electronic device 102. The signal may have been received from an RFID tag of the electronic device 102 and by an RFID reader of the access device 504. The signal may have been received using another wireless or wired communication method between the electronic device 102 and the access device 504. The signal may be received by the access device 504 from the electronic device 102 in response to a signal previously sent by the access device 504 or another device.

In certain embodiments, in addition to the electronic device identifier, the access device 504 may also obtain from the electronic device 102 other information capable of being generated, obtained, or stored by the electronic device 102.

At S932, the access device 504 may indicate to the server 804 that a transaction associated with the electronic device 102 has been performed. The indication may include the electronic device identifier, an access device identifier, a time, a location (e.g., of the access device), a price, the type of electronic device, and/or any other information capable of being obtained, generated, or stored by the access device 504.

The server 804 may store one or more portions of the information received from the access device 504 in memory of the server 804. In certain embodiments, the server 804 may cause the device identifier to be removed from memory of the server 804.

At S934, the server 804 may transmit one or more portions of the information received from the access device 504 to the wireless device 810. The one or more portions may indicate that a transaction was performed associated with the electronic device identifier.

At S936, the wireless device 810 may remove the device identifier from memory of the wireless device 810. In certain embodiments, the wireless device 810 may store an indication that a transaction has been performed relating to a device identifier stored in memory. The wireless device 810 may remove the device identifier from memory after an indication that a transaction associated with the electronic device 102 has been performed. Removing the device identifier from memory may prevent a command to lock the electronic device 102 from being sent to the electronic device 102 if the electronic device 102 is detected within proximity to the boundary. In certain embodiments, instead of removing, the device identifier from memory, a different indication that a transaction associated with the electronic device 102 has occurred is stored in memory and associated with the device identifier.

At S938, the electronic device 102 may be within range of the wireless device. The wireless device 810 may receive a signal indicating the electronic device 102 is approaching the boundary. The electronic device 102 may be in an unlocked state that permits use of at least one aspect of the functionality.

In certain embodiments, the wireless device 810 receives the signal from the electronic device 102 after a transmitter of the wireless device 810 or another transmitter transmits a signal that is received by the electronic device 102. The wireless device 810 may include an RFID sensor that is capable of reading a signal from an RFID tag of the electronic device 102. A different device than the wireless device 810 (e.g., a different RFID sensor) may be within proximity to the boundary (e.g., at a location within the boundary) and cause the wireless device 810 and/or the server 804 to determine that the electronic device 102 is within proximity to the boundary. In response, the wireless device 810 may perform step S940.

In certain embodiments, the wireless device 810 includes the same type of sensor as one or more sensors included in the first set of sensors 802.

At S940, the wireless device 810 may determine whether the electronic device 102 is to be put into a locked state that prevents use of that at least one aspect of the functionality. The determination may be made based on whether a signal was received from the wireless device 810 or another device within communication range of the boundary (e.g., in proximity to the boundary). The determination may further comprise determining if the memory of the wireless device 810 includes the device identifier of the electronic device 102 or determining if the device identifier of the electronic device 102 is in a memory of the wireless device 810 and/or the server 804. The device identifier may not be stored in memory of the wireless device 810 and/or the server 804 if a transaction has been performed associated with the electronic device identifier.

In certain embodiments, the electronic device identifier is stored in memory (e.g., of the wireless device 810 and/or the server 804) and is associated with an indication that a transaction has been performed related to the electronic device 102, enabling the wireless device 810 to forego sending the command to put the electronic device 102 into a locked state based on the transaction that relates to the electronic device 102.

In certain embodiments, step S924 and S926 are not performed. In such embodiments, the wireless device 810 does not maintain a list of electronic device identifiers indicating electronic devices 102 to be locked if sensed within proximity to the boundary. In such embodiments, the wireless device 810 may send, to a server 804 maintaining a list of devices to be locked, a signal indicating the electronic device 102 is approaching the boundary. In response, the wireless device 810 may receive, from the server 804, a response indicating the electronic device 102 is to be put into a locked state based on the device identifiers maintained by the server 804 and whether they are associated with devices to be locked if sensed near the boundary.

In certain embodiments, the electronic device 102 may include an antenna and an RFID tag. The RFID tag may be a passive or an active RFID tag. The length of the antenna may be greater than any dimension of the electronic device 102. Such embodiments are further described below with respect to FIG. 11.

Figure 10:
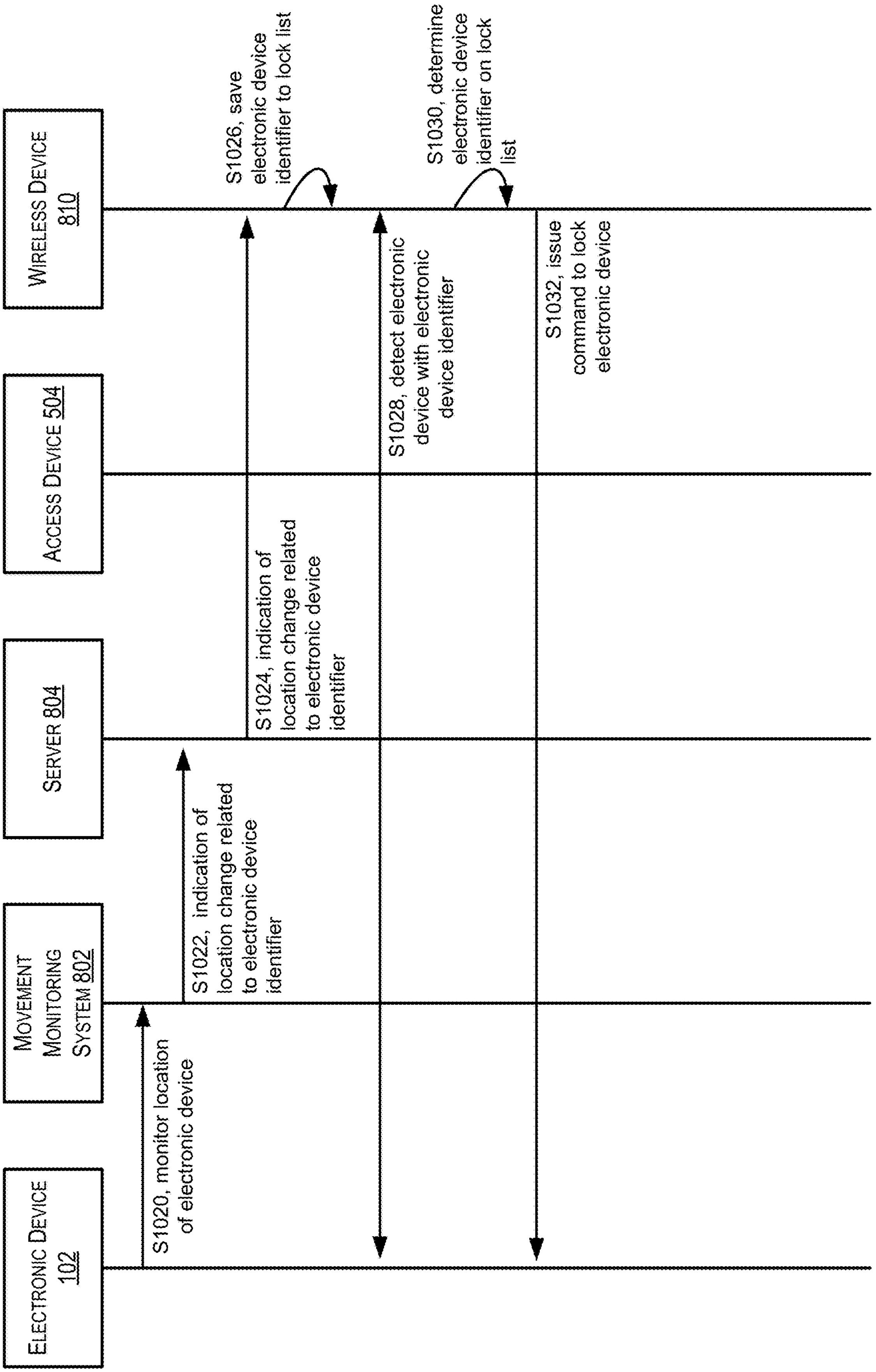
FIG. 10 depicts a diagram illustrating a process for sending a command to an electronic device based on the location of the electronic device in accordance with at least some embodiments.

FIG. 10 depicts a diagram illustrating a process for sending a command to an electronic device 102 based on the location of the electronic device 102 in accordance with at least some embodiments. The diagram includes a system comprising the electronic device 102, a first set of sensors 802, a server 804, an access device 504, and a wireless device 810. The components may be configured to operate as described herein above.

Steps S1020, S1022, S1024, S1026 may be performed as described with respect to steps S920, S922, S924, and S926, respectively. Step S1028 may be performed as described with respect to step S938.

At S1030, the wireless device 810 may determine whether the electronic device 102 sensed within proximity of the wireless device 810 (e.g., approaching the boundary) should be instructed to be put into an unlocked state. The wireless device 810 may perform the determination based on a list of device identifiers that are stored in memory. The memory may be local to the wireless device 810. The memory may be remote to the wireless device 810.

In certain embodiments, the memory may be the memory of the server 804. In such embodiments, the wireless device 810 sends a request to the server 804. The request may include the device identifier of the electronic device 102 so the server 804 can perform a search in memory to determine if the electronic device identifier is associated with a transaction. The result of the search performed by the server 804 may be sent to the wireless device 810. The result may indicate whether the wireless device 810 is to send a command to the electronic device 102, causing the electronic device 102 to be put into a locked state.

The memory (e.g., of the wireless device 810, of the server 804) may be configured to store an indication that a transaction has occurred and associate the indication of the transaction in memory with the device identifier. The memory may be configured to store device identifiers of electronic devices that are not associated with a transaction. The memory may not store device identifiers of electronic devices that are associated with a transaction. In certain embodiments, the memory may determine whether a signal indicating the electronic device 102 is to be put into a locked state that prevents use of the at least one aspect of the functionality was previously received.

In certain embodiments, the memory may indicate that the electronic device 102 is to be locked. When the memory indicates the electronic device 102 is to be locked, step S1032 may be performed.

At S1032, the wireless device 810 may send a command to put the electronic device 102 into the locked state. In certain embodiments, the command may additionally be transmitted by one or more other wireless devices to increase the likelihood the signal will successfully reach the electronic device 102.

In certain embodiments, when the wireless device 810 sends the command to lock the electronic device 102, the command or another message may be signed by the wireless device 810. In certain embodiments, the command or the other message is signed by the server 804 and transmitted to the electronic device 102 by the wireless device 810. The command or the other message may be signed using a private key of a key pair. The electronic device 102 may have access to (e.g., stored in memory) a public key of the key pair. The electronic device 102 may be capable of verifying the server or the wireless device 810 the command or the other message originated from. In certain embodiments, the electronic device 102 complies with commands signed by certain devices (e.g., the server 804, the wireless device 810) that are verified.

In certain embodiments, after the electronic device 102 has been put into a locked state (e.g., by the wireless device 810), the electronic device 102 may be unlocked. The access device 504 may be capable of unlocking the electronic device 102. During a transaction, the access device 504 may receive an indication from the electronic device 102 that the electronic device 102 is in a locked state. The access device 504 may transmit a command (e.g., in response to the indication) to unlock the electronic device 102. The command may be signed by a private key. In certain embodiments, in addition to or an alternative to the access device 504 being capable of unlocking the electronic device 102, one or more sensors in the first set of sensors 802 may be configured to transmit an unlock command to the electronic device 102. In certain embodiments, one or more transmitters within the boundary may transmit a command to the electronic device 102 to unlock the electronic device 102.

In certain embodiments, the wireless device 810 and/or the server 804 may determine that the electronic device 102 is in an unlocked state and that the electronic device 102 is associated with a transaction. Responsive to these determinations, the wireless device 810 and/or the server 804 may cause a command to be transmitted (e.g., by the wireless device 810, by a transmitter in proximity to the boundary, by a transmitter in proximity to the electronic device 102) to the electronic device 102 to cause the electronic device 102 to remain in the unlocked state or be put into an unlocked state.

In certain embodiments, the electronic device 102 may store transaction information. The transaction information may be received from the access device 504 during a transaction. In embodiments where the electronic device 102 stores transaction information, the transaction information may be transmitted to the wireless device 810 (e.g., when the device identifier is transmitted to the wireless device 810 and used to determine the electronic device 102 is within proximity to the boundary) and cause the wireless device 810 to either forgo sending a command or send a command to the electronic device 102 depending on the transaction information sent by the electronic device 102. Such embodiments may not include the server 804 or reduce the communication performed with the server 804 and other components of the system 800.

In certain embodiments, the electronic device 102 may receive transaction information from the access device 504 during a transaction and at least a first portion of the transaction information can be transmitted from the electronic device 102 to the wireless device 810 when the electronic device 102 is brought within proximity to the wireless device 810. The wireless device 810 may have previously received at least a second portion of the transaction information from the access device 504 and may compare the second portion to the first portion to determine if a transaction was conducted associated with the electronic device 102. In certain embodiments, after the wireless device 810 receives the first portion from the electronic device 102, the wireless device 810 may request the second portion from the access device 504, the server 804, and/or transmit the first portion to the access device 504 and/or server 804 to determine whether the wireless device 810 will instruct the electronic device 102 to be put into a locked state. In certain embodiments, the first portion received by the wireless device 810 from the electronic device 102 may be capable of verifying the transaction occurred without receiving transaction information from the access device 504(e.g., the transaction information may be signed by the access device's 504 private key and the wireless device 810 may be capable of verifying the signature of the access device 504 with the public key of the access device 504).

Figure 11:
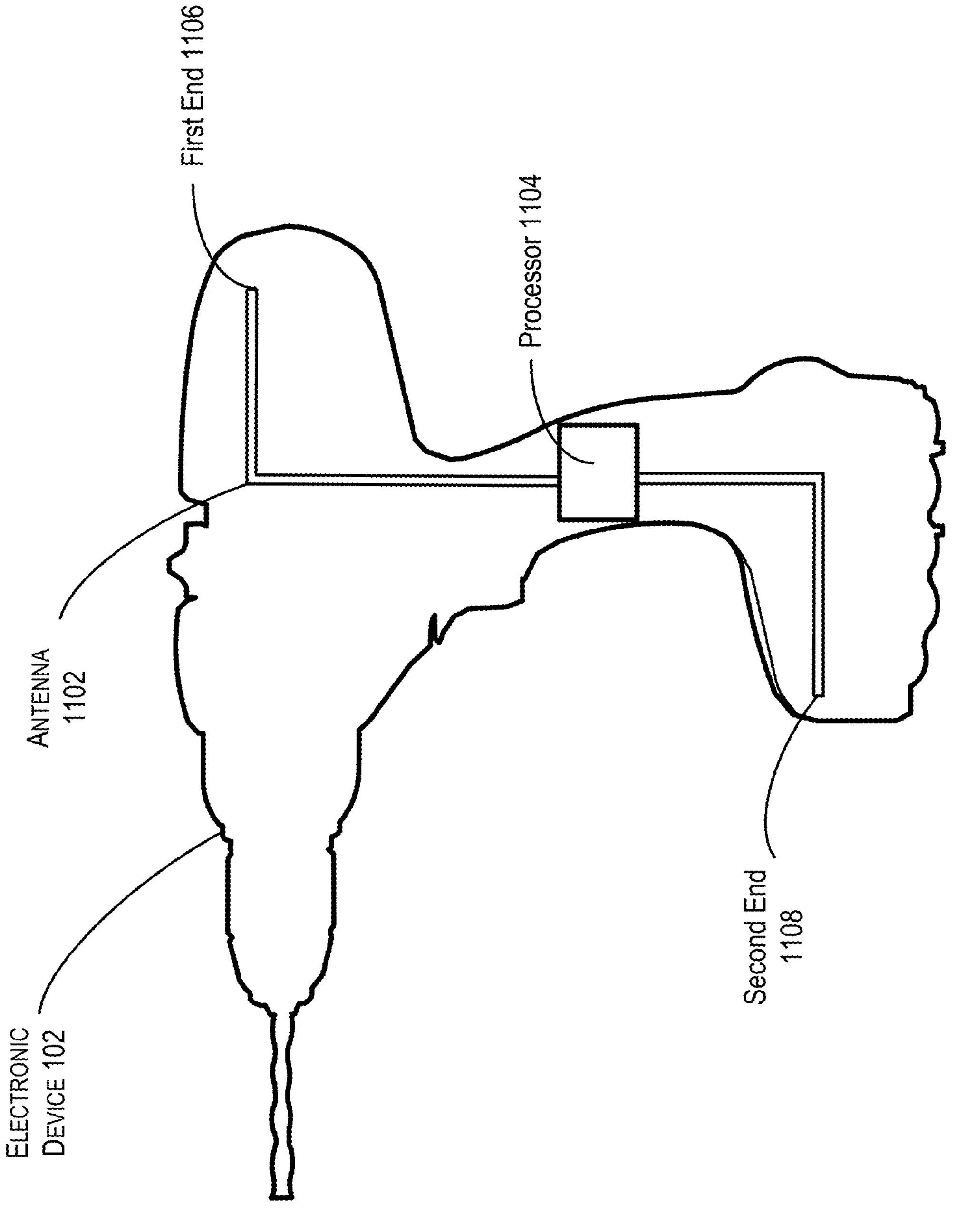
FIG. 11 depicts an illustration of an electronic device comprising an antenna in accordance with at least some embodiments.

FIG. 11 depicts an illustration of an electronic device 102 comprising an antenna 1102 in accordance with at least some embodiments. For simplicity of illustration, electronic device 102 has the outline of a power drill, but the electronic device 102 may be any electronic device. The electronic device 102 may include the antenna 1102 embedded within the electronic device 102 and a processor electrically coupled with the antenna. The processor 1104 may be included in or with an RFID tag.

The antenna 1102 may include any number of ends and may be capable of receiving RF transmissions. In the illustrated embodiments, the antenna 1102 includes a first end 1106 and a second end 1108. The processor 1104 and/or RFID tag may be included between the first end 1106 and the second end 1108. The processor 1104 may be included in the middle between the first end 1106 and the second end 1108 or offset from the middle.

The antenna 1102 may be configured to receive a signal from a transmitter (e.g., an RFID reader) and use energy from the received signal to power operations of the processor 1104. The processor 1104 may operate to obtain the electronic device identifier from memory and transmit the electronic device identifier. The electronic device identifier may be transmitted to one or more devices (e.g., the RFID reader, a first set of sensors, a wireless device, an access device, a user device, etc.).

The length of the antenna 1102 measured between the first end 1106 and the second end 1108 may be greater than any dimension of the electronic device 102. The antenna 1102 may be a dipole antenna. The antenna 1102 may include one or more bends. In certain embodiments, the antenna 1102 includes two bends each of substantially (e.g., plus or minus 5 degrees) 90 degrees. The antenna may be used to transmit and/or receive communications with a radio frequency of 125 KHz, 134 KHz, 13.56 MHz, 860-956 MHz, 433 MHz, 2.45 GHz, and/or 5.6 GHz, among other frequencies.

In certain embodiments, the length of the antenna 1102 from the first end 1106 to the processor 1104 is 75 millimeters or longer and the length of the antenna 1102 from the second end 1108 to the processor 1104 is 75 millimeters or longer. The portion of the antenna 1102 between the first end 1106 and the processor 1104 may include two sub portions separated by a bend, a first sub-portion may be at least 40 millimeters long and a second sub-portion may be at least 35 millimeters long.

The processor 1104 may operate to perform instructions that cause the electronic device 102 to change to a locked state or an unlocked state. The processor 1104 may operate to perform instructions that cause the electronic device 102 to transmit via the antenna 1102, the device identifier of the electronic device 102. The processor 1104 may operate to perform instructions that cause the electronic device 102 to be powered after the antenna 1102 receives a signal.

In certain embodiments, upon the processor 1104 determining that the state of the electronic device 102 is to be changed to a locked state, the processor 1104 may transmit a signal to a power cutoff device. The power cutoff device may include a power transistor inserted electrically in series with a positive power wire between a battery of the electronic device 102 and a driver board of the electronic device 102.

In certain embodiments, the processor 1104 may control at least one aspect of the functionality of the electronic device 102 and may be configured to prevent use of the at least one aspect of the functionality when the electronic device 102 is in a locked state.

Embodiments described herein can be used to put an electronic device into a locked state when the tool leaves an area without being associated with a transaction (e.g., purchased). Some benefits of embodiments described herein are that the use of the electronic devices outside of a boundary are not dependent on an unlocking device successfully communicating with the wireless device, which can present problems when the electronic device is associated with a transaction but the electronic device is not unlocked.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computer system, the method comprising:

receiving a first signal indicating that a location of a first electronic device has changed, the first electronic device having functionality and being in an unlocked state that permits use of at least one aspect of the functionality;

storing, based on the first signal, an indication that the first electronic device is to be put into a locked state that prevents use of the at least one aspect of the functionality; and causing, based on a second signal indicating the first electronic device is in a proximity to a boundary, at least one of:

sending a command to put the first electronic device into the locked state, or foregoing the sending of the command based on a transaction that relates to the first electronic device.

2. The method of claim 1, further comprising:

responsive to receiving the second signal, foregoing the sending of the command based on the transaction.

3. The method of claim 1, further comprising:

receiving a third signal indicating that a second electronic device is in the proximity to the boundary, the second electronic device being in the unlocked state; and causing, based on the third signal indicating the second electronic device is in the proximity to the boundary and a lack of a second transaction that relates to the second electronic device, a second command to be sent to the second electronic device, the second command causing the second electronic device to change from the unlocked state to the locked state.

4. The method of claim 1, wherein the first signal is received from a set of one or more sensors configured to monitor locations of electronic devices within an area, and wherein the first signal is received after the location of the first electronic device corresponds to the first electronic device being out of range of a first sensor of the set of one or more sensors.

5. The method of claim 1, wherein the command is sent by at least one of a server or by a wireless device within a communication range of the boundary.

6. The method of claim 1, wherein the indication that the first electronic device is to be locked is stored in memory of at least one of: a server or a wireless device within a communication range of the boundary.

7. The method of claim 6, wherein the indication is associated with a time to live that is increased when a third signal indicates a second location of the first electronic device has changed.

8. The method of claim 1, wherein the second signal is received by a server from a wireless device within a communication range of the boundary after the wireless device receives a third signal from the first electronic device.

9. The method of claim 1, wherein determining the location has changed is based on a first Radio Frequency Identification (RFID) sensor reading of an RFID tag of the first electronic device by a first sensor located within range of an area storing multiple electronic devices, and wherein determining the first electronic device is in the proximity to the boundary is based on a second RFID sensor reading of the RFID tag by a second sensor located within range of the boundary, and wherein the location is within the boundary.

10. The method of claim 1, wherein the first electronic device complies with the command to lock the first electronic device if the computer system that issues the command signs a message using a private key of a key pair, and the first electronic device verifies the computer system using a public key of the key pair.

11. The method of claim 1, wherein the second signal is received after the first signal and when the first electronic device is within communication range of a transceiver, and wherein the second signal and the first signal are received from a same type of sensors.

12. A method implemented by a computer system, the method comprising:

receiving a first signal from a first electronic device indicating the first electronic device is approaching a boundary, the first electronic device having functionality and being in an unlocked state that permits use of at least one aspect of the functionality;

determining whether a second signal, indicating that the first electronic device is to be put into a locked state that prevents use of the at least one aspect of the functionality, was previously received; and performing, based on the second signal, one of:

issuing a command to the first electronic device to put the first electronic device into the locked state, or foregoing the issuing of the command based on a transaction that relates to the first electronic device.

13. The method of claim 12, wherein determining whether the second signal was previously received comprises:

determining if a memory of a wireless device that received the first signal includes an identifier for the first electronic device, the boundary being in a communication range of the wireless device.

14. The method of claim 12, wherein determining whether the second signal was previously received comprises:

sending, to a server maintaining a list of devices to be locked, a signal indicating the first electronic device is approaching the boundary; and receiving, from the server, a response indicating the first electronic device is to be locked.

15. The method of claim 12, wherein the first signal includes an indication of whether the transaction associated with the first electronic device occurred, and the method further comprises:

performing, based on the second signal and the first signal, one of:

issuing the command to the first electronic device to put the first electronic device into the locked state, or foregoing the issuing of the command based on the transaction that relates to the first electronic device.

16. The method of claim 12, further comprising:

receiving a third signal from a second electronic device indicating the second electronic device is approaching the boundary, the second electronic device being in the unlocked state;

determining whether a fourth signal, indicating that the second electronic device is to be put into the locked state was previously received; and issuing, based on the fourth signal, a second command to the second electronic device to put the second electronic device into the locked state.

17. The method of claim 12, wherein the first signal is received based on a radio frequency (RF) transmission that uses an antenna embedded in the first electronic device, the antenna connected to a Radio Frequency Identification (RFID) chip of the first electronic device, wherein a length of the antenna is greater than any dimension of the first electronic device.

18. The method of claim 17, wherein the RFID chip is between a first end of the antenna and a second end of the antenna.

19. A non-transitory computer-readable medium storing specific computer-executable instructions that, when executed by a processor, cause a computer system to at least:

receive a first signal indicating that a first location of a first electronic device has changed, the first electronic device having functionality and being in an unlocked state that permits use of at least one aspect of the functionality;

store, based on the first signal, an indication that the first electronic device is to be put into a locked state that prevents use of the at least one aspect of the functionality; and cause, based on a second signal indicating the first electronic device is in proximity to a boundary, at least one of:

sending a command to put the first electronic device into the locked state, or foregoing the sending of the command based on a transaction that relates to the first electronic device.

20. The non-transitory computer-readable medium of claim 19, wherein the executable instructions, when executed by the processor, further cause the computer system to at least: responsive to receiving the second signal, forego the sending of the command based on the transaction.

* * * * *